(12) United States Patent
Tsubamoto

(10) Patent No.: US 8,260,572 B2
(45) Date of Patent: Sep. 4, 2012

(54) APPARATUS FOR EVALUATING SIGNAL TRANSMISSION SYSTEM, METHOD OF EVALUATING SIGNAL TRANSMISSION SYSTEM, AND STORAGE MEDIUM STORING PROGRAM FOR EVALUATING SIGNAL TRANSMISSION SYSTEM

(75) Inventor: Daita Tsubamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 398 days.

(21) Appl. No.: 12/547,857

(22) Filed: Aug. 26, 2009

(65) Prior Publication Data

US 2010/0054317 A1 Mar. 4, 2010

(30) Foreign Application Priority Data

Sep. 1, 2008 (JP) ................................. 2008-223434

(51) Int. Cl.
*G06F 19/00* (2006.01)
(52) U.S. Cl. ...................... 702/181; 455/67.13; 702/189
(58) Field of Classification Search .................... 702/66, 702/69, 71, 73, 81, 106, 179, 181, 182, 183, 702/185, 189; 375/224; 455/67.13; 703/13
See application file for complete search history.

(56) References Cited

U.S. PATENT DOCUMENTS 7,908,120 B2 * 3/2011 Pastrana et al. ................ 702/189
2009/0280749 A1 * 11/2009 Tanno et al. ................ 455/67.13

FOREIGN PATENT DOCUMENTS

JP 2005-278014 A 10/2005

\* cited by examiner

*Primary Examiner* — John H Le
(74) *Attorney, Agent, or Firm* — Westerman, Hattori, Daniels & Adrian, LLP

(57) ABSTRACT

A signal transmission system evaluation apparatus acquires statistics about a variation in a characteristic value and a limit value of the characteristic value corresponding to a given range of variation, with respect to each of the characteristic values which represent characteristics of the components. The apparatus calculates a probability distribution with respect to each of the characteristic values, based on the statistic acquired, calculates an eye-opening of the signal transmission system in case that the characteristic value is the limit value, makes an adjustment of the limit value. The apparatus calculates a yield rate of the signal transmission system based on the probability distribution and the limit value.

20 Claims, 26 Drawing Sheets

NEGATIVE MARGIN

POSITIVE MARGIN

| RANK ORDER | ITEM | RATE OF RANGE OF VARIATION |
|---|---|---|
| 1 | OUTPUT AMPLITUDE | 20% |
| 2 | OUTPUT JITTER | 18% |
| 3 | INPUT AMPLITUDE | 15% |
| 4 | trtf | 8% |

| RANK ORDER | ITEM | IMPROVEMENT COEFFICIENT |
|---|---|---|
| 1 | OUTPUT AMPLITUDE | 5.5 |
| 2 | OUTPUT JITTER | 4.3 |
| 3 | INPUT AMPLITUDE | 2.8 |
| 4 | trtf | 1.3 |

APPARATUS FOR EVALUATING SIGNAL TRANSMISSION SYSTEM, METHOD OF EVALUATING SIGNAL TRANSMISSION SYSTEM, AND STORAGE MEDIUM STORING PROGRAM FOR EVALUATING SIGNAL TRANSMISSION SYSTEM

CROSS-REFERENCE TO RELATED APPLICATIONS

This application is based on and claims the benefit of priority of the prior Japanese Patent Application No. 2008-223434, filed on Sep. 1, 2008, the entire contents of which are incorporated herein by reference.

FIELD

The present embodiment relates to an evaluation apparatus and an evaluation method for evaluating a signal transmission system where the quality of signal transmission systems is evaluated.

BACKGROUND

In recent years, the amount of information, which undergoes processing by digital electronic apparatuses, has been steadily increasing. In response to the increase in the amount of such information, signal speed within such apparatuses also increases. As a result thereof, there is a trend that a transmission margin is decreasing. It is desirable therefore, that various causes of margin degradation be evaluated from a variety of viewpoints and the transmission margin be correctly evaluated.

When the transmission margin of a product is calculated in a conventional way of calculating the transmission margin, a risk that includes a component variation is calculated. For this reason, the following method has been employed. That is, first, a predetermined value that includes a margin with respect to each of the items is used. Then, the predetermined values are summed up in the conventional way of calculation.

As one example of a conventional technique, Japanese Laid-Open Patent Application 2005-278014 discusses a method of measuring a code error rate. In the technique disclosed above, a code error rate at a high-speed system level is measured in a high-speed digital transmission.

However, the number of margins included in determination values of the transmission margin increases in the measurement method discussed above. As a result, it is very difficult to satisfy such determination values. Consequently, the above measurement method results in the use of expensive components in order to satisfy the determination values of the transmission margins, and the use of expensive components causes an increase in overall manufacturing costs. Meanwhile, relatively low yield rates are permissible with regard to certain types of components when such types of components are applied to specific types of products. In order to make determinations on the transmission margins of a variety of products, it is desirable to achieve a system where determination criteria may be flexibly changed depending on circumstances.

SUMMARY

Accordingly, it is an object in one aspect of the invention to provide a signal transmission system evaluation apparatus which evaluates a quality of a signal transmission system which includes a sending device, a transmission path, and receiving device, as a component in which the signal transmission system evaluation apparatus includes an acquisition unit which acquires statistics about a variation in a characteristic value and a limit value of the characteristic value corresponding to a given range of variation, with respect to each of the characteristic values which represent characteristics of the components, a probability distribution calculation unit which calculates a probability distribution with respect to each of the characteristic values, based on the statistics acquired by the acquisition unit, an eye-opening calculation unit which calculates an eye-opening of the signal transmission system in case that the characteristic value is the limit value, an adjustment unit which makes an adjustment of the limit value so that the eye-opening calculated by the eye-opening calculation unit satisfies a given eye-opening condition, and a yield rate calculation unit which calculates a yield rate of the signal transmission system, based on the probability distribution calculated by the probability distribution calculation unit and the limit value adjusted by the adjustment unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF EMBODIMENTS

Hereinafter, an embodiment of the present invention will be disclosed with reference to drawings.

An evaluation apparatus for evaluating a signal transmission system according to the embodiment calculates an existing probability (yield rate of printed board) of printed boards (signal transmission system) in which bit errors are not generated (that is to say, variations in all characteristics fall within predetermined values). Based on a statistic viewpoint, the evaluation apparatus for the signal transmission system determines a reference value from among values, which represent component characteristics, and the evaluation apparatus calculates a percentage of combination of the components, which satisfies the reference value, among the total number of on-board components.

Hereinafter, a structure of the signal transmission system, which is a target of the evaluation apparatus for evaluating the signal transmission system according to the embodiment, will be disclosed.

Figure 1:
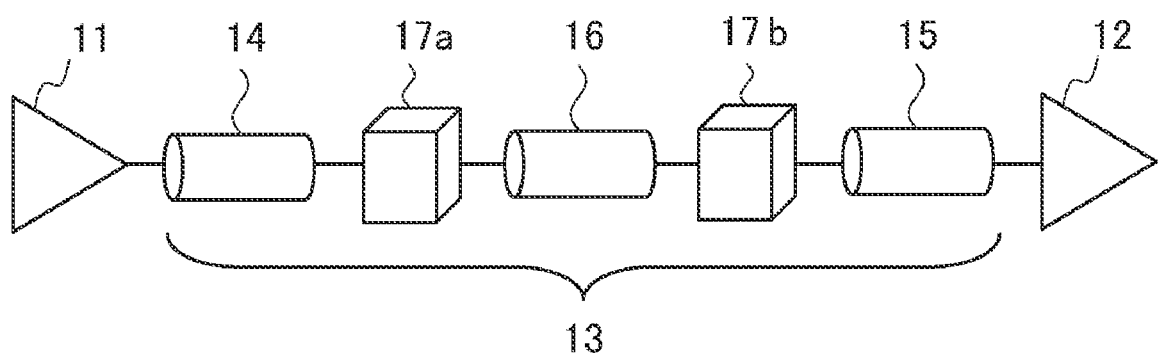
FIG. 1 illustrates a block diagram indicative of one example of a structure of a signal transmission system according to an embodiment.

FIG. 1 is a block diagram illustrating one example of a structure of the signal transmission system according to the embodiment. The signal transmission system includes a sending element 11, a receiving element 12, and a transmission path 13. The sending element 11 is mounted on a sending plug-in-unit (PIU) 14. The receiving element 12 is mounted on a receiving PIU 15. The sending PIU 14 is mounted on a back wiring board (BWB) 16 through a connector 17a. The receiving PIU 15 is mounted on the BWB 16 through a connector 17b. The transmission path 13 includes the sending PIU 14, the receiving PIU 15, the BWB 16, the connector 17a, and the connector 17b.

A signal sent from the sending element 11 passes through the sending PIU 14, the connector 17a, the BWB 16, the connector 17b, and the receiving PIU 15 and thereafter reaches the receiving element 12.

Next, a structure of the evaluation apparatus for evaluating the signal transmission system according to the embodiment will be disclosed hereinafter.

Figure 2:
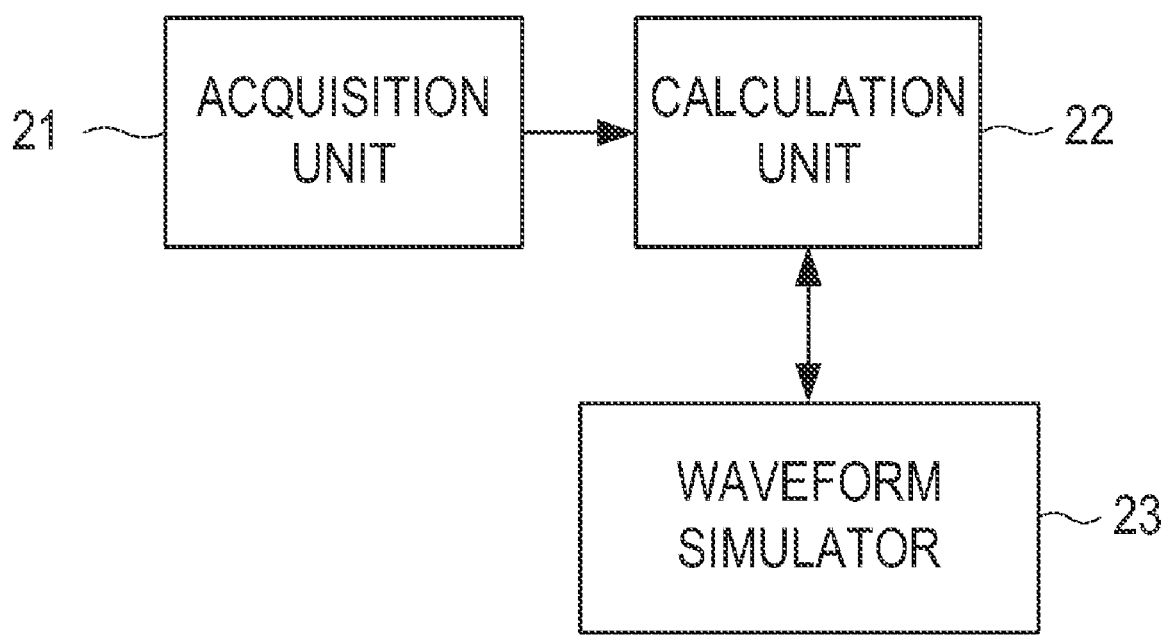
FIG. 2 illustrates a block diagram indicative of one example of a structure of an evaluation apparatus for evaluating a signal transmission system according to the embodiment.

FIG. 2 is a block diagram illustrating one example of the structure of the evaluation apparatus for evaluating the signal transmission system according to the embodiment. The evaluation apparatus for the signal transmission system includes an acquisition unit 21, a control unit 22, and a waveform simulator 23. The evaluation apparatus for evaluating the signal transmission system includes an evaluation program that is stored on a storage medium. The evaluation program for evaluating the signal transmission system is operated by a computer that executes this evaluation program. Note that the control unit 22 corresponds to a probability distribution calculation unit, an adjustment unit, and a yield rate calculation unit. The waveform simulator 23 corresponds to an eye-opening calculation unit.

Hereinafter, an operation of the evaluation apparatus for the signal transmission system according to the embodiment will be disclosed.

Figure 3:
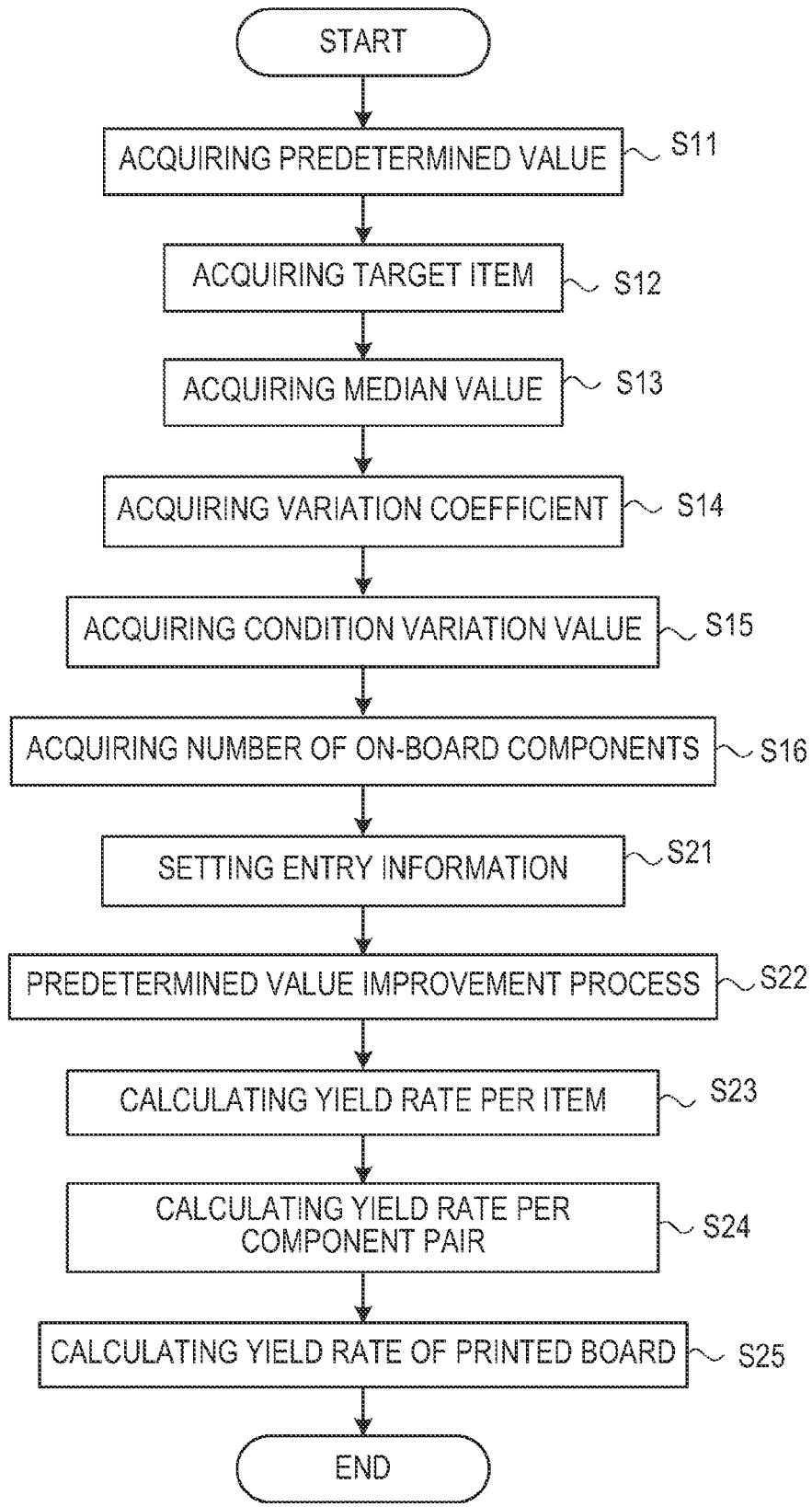
FIG. 3 is a flow chart indicative of one example of an operation of the evaluation apparatus for evaluating the signal transmission system according to the embodiment.

FIG. 3 is a flow chart illustrating one example of the operation of the evaluation apparatus for the signal transmission system according to the embodiment.

First, the acquisition unit 21 displays an entry screen for entering a predetermined value hereinafter, referred to as a "predetermined value entry screen." The acquisition unit 21 acquires a predetermined value (limit value) with respect to each of the items and stores the acquired predetermined value as a default predetermined value (S11). Note that the predetermined value is entered by a user.

A predetermined value for a predetermined characteristic is entered with respect to each component, for example, the sending/receiving elements, transmission path (such as wirings), and so on, on the predetermined value entry screen. Typically, values listed on a specification sheet, supplied by a component manufacturer, are used as such predetermined values. The predetermined value means a value having a characteristic that corresponds to a predetermined range of variation (for example, 3σ). A probability distribution of the variation in characteristics of components is assumed to represent a normal distribution, in the embodiment.

Figure 4:
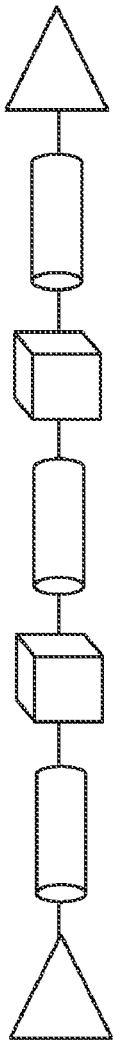
FIG. 4 illustrates a screen indicative of one example of an entry screen for entering a predetermined value(s) according to the embodiment.

FIG. 4 illustrates a screen indicative of one example of an entry screen for entering a predetermined value(s) (referred to as a "predetermined value entry screen") according to the embodiment. Here, the predetermined value entry screen displays items related to the sending element 11 (sending device), items related to the receiving element 12 (receiving device), items related to the transmission path 13 (printed board), and entry fields of the predetermined values for each of the items. The items related to the sending device include a minimum (MIN) value of output amplitude, a minimum (MIN) value of an output jitter, a minimum (MIN) value of a pre-emphasis, and maximum (MAX) values of the pre-emphasis. The items related to the receiving device include a minimum (MIN) value of mask amplitude, a minimum (MIN) value of a mask time width, and a minimum (MIN) value of a built-in termination resistor. The items related to the printed wiring board include a maximum (MAX) value of a sending PIU loss, a maximum (MAX) value of a BWB loss, a maximum (MAX) value of a receiving PIU loss.

Next, the acquisition unit 21 displays a selection screen for selecting a target item(s) (hereinafter, referred to as a "target item selection screen") and acquires the target item(s) selected by the user (S12).

Figure 5:
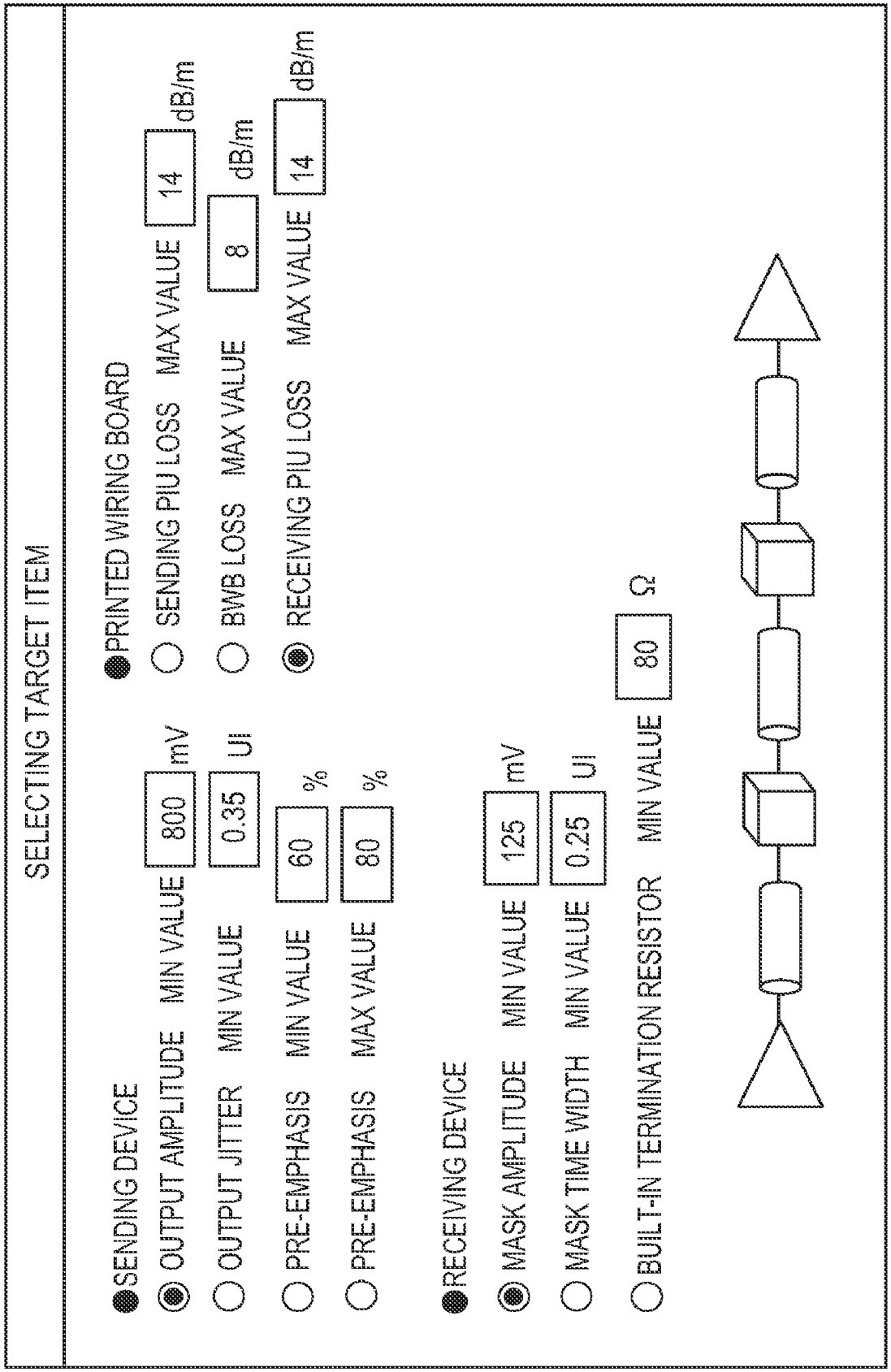
FIG. 5 illustrates a screen indicative of one example of a target selection screen for selecting a target item(s) according to the embodiment.

FIG. 5 illustrates a screen indicative of one example of the target item selection screen according to the embodiment. The item(s) that have an affect on a calculation of combination risks are listed, as the target items, on the target item selection screen. The target item(s) according to a reference setting includes all the items displayed on the predetermined value entry screen. The user is capable of excluding a particular item(s), which does not have an affect on the combination risks, from the target items, depending on circumstances.

Next, the acquisition unit 21 displays an entry screen for entering a median value (hereinafter, referred to as a "median value entry screen") and acquires the median value with respect to each of the target items (S13). Note that the median value is entered by the user.

Figure 6:
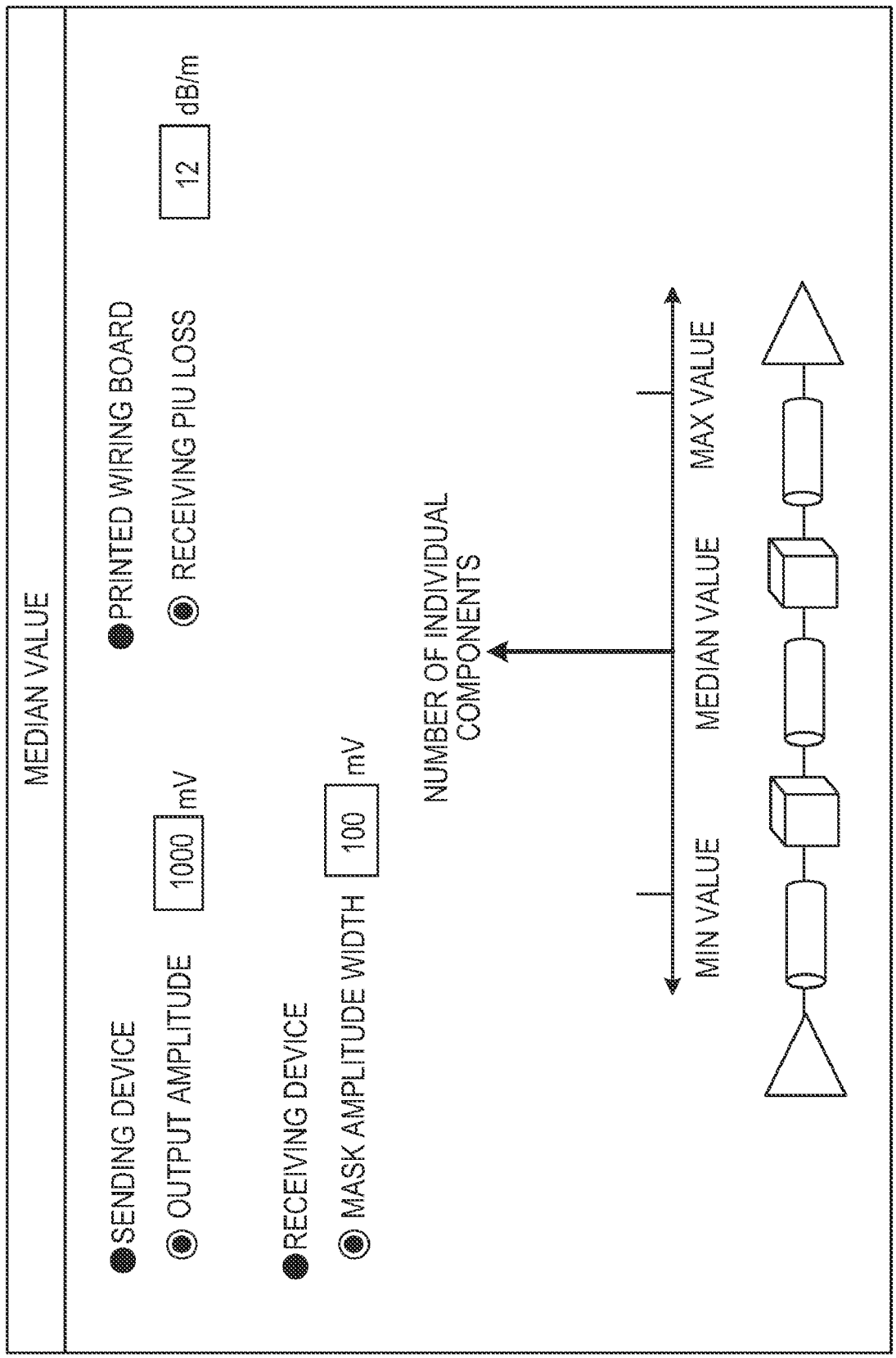
FIG. 6 illustrates a screen indicative of one example of an entry screen for entering a median value(s) according to the embodiment.

FIG. 6 illustrates a screen indicative of one example of the median value entry screen according to the embodiment. The median value entry screen receives an entry of the median value of the variation with respect to each of the target items. It is typical that the median value of the variation may be obtained in the following manner. First, plural samples of a certain component are measured under a normal condition, and the median value is defined based on the values thus measured. A "TYP value" described on the specification sheet of the components may be frequently the one which is used for the median value.

Then, the acquisition unit 21 displays an entry screen for entering a variation coefficient (hereinafter, referred to as a "variation coefficient entry screen"), and acquires a variation coefficient with respect to each of the target items (S14). Note that the variation coefficient is entered by the user.

Figure 7:
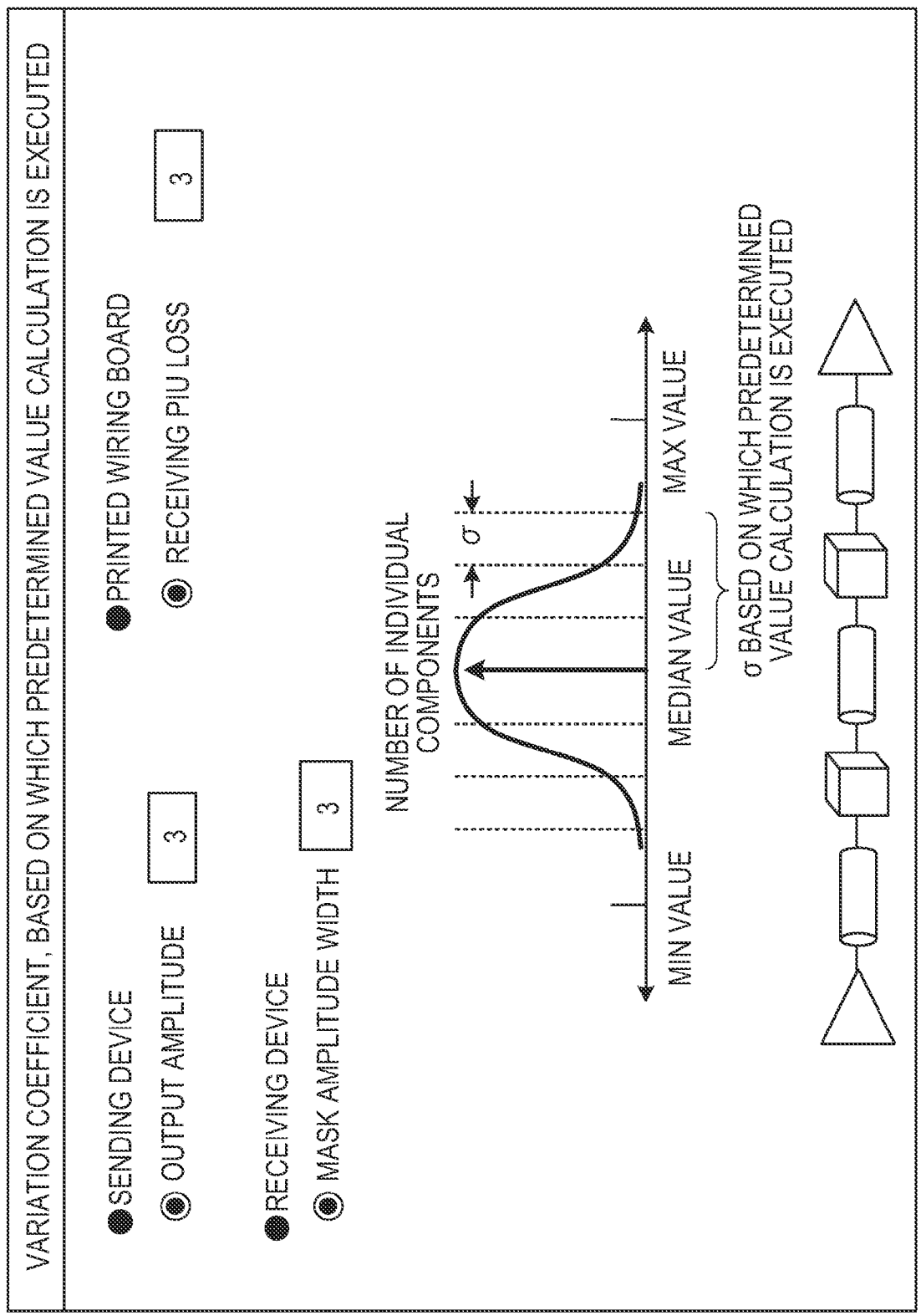
FIG. 7 illustrates a screen indicative of one example of an entry screen for entering a variation coefficient(s) according to the embodiment.

FIG. 7 illustrates a screen indicative of one example of the variation coefficient entry screen according to the embodiment. The variation coefficient entry screen receives an entry of the variation coefficient(s), based on which the calculation of the default predetermined value is executed. A range of variation means a range of manufacturing variation that is taken into account as a margin in eliciting the default predetermined value from evaluation results. It is typical that the range of variation is defined by a multiple number(s) (nσ) of a standard deviation σ. The user enters the variation coefficient n that is obtained by "range of variation nσ/standard deviation σ" into the variation coefficient entry screen. Since manufactures do not release such value(s), it is desirable to obtain the value from the manufacturers. However, if the value is not able to be obtained, it is also possible to estimate the value by using "3 sigma (σ) per side" that is a value typically used for cases where the value is unavailable.

Then, the acquisition unit 21 displays an entry screen for entering a condition variation value (hereinafter, referred to as a "condition variation value entry screen"). The condition variation value entry screen receives an entry of a condition variation value with respect to each of the target items (S15). Note that the condition variation value is entered by the user.

Figure 8:
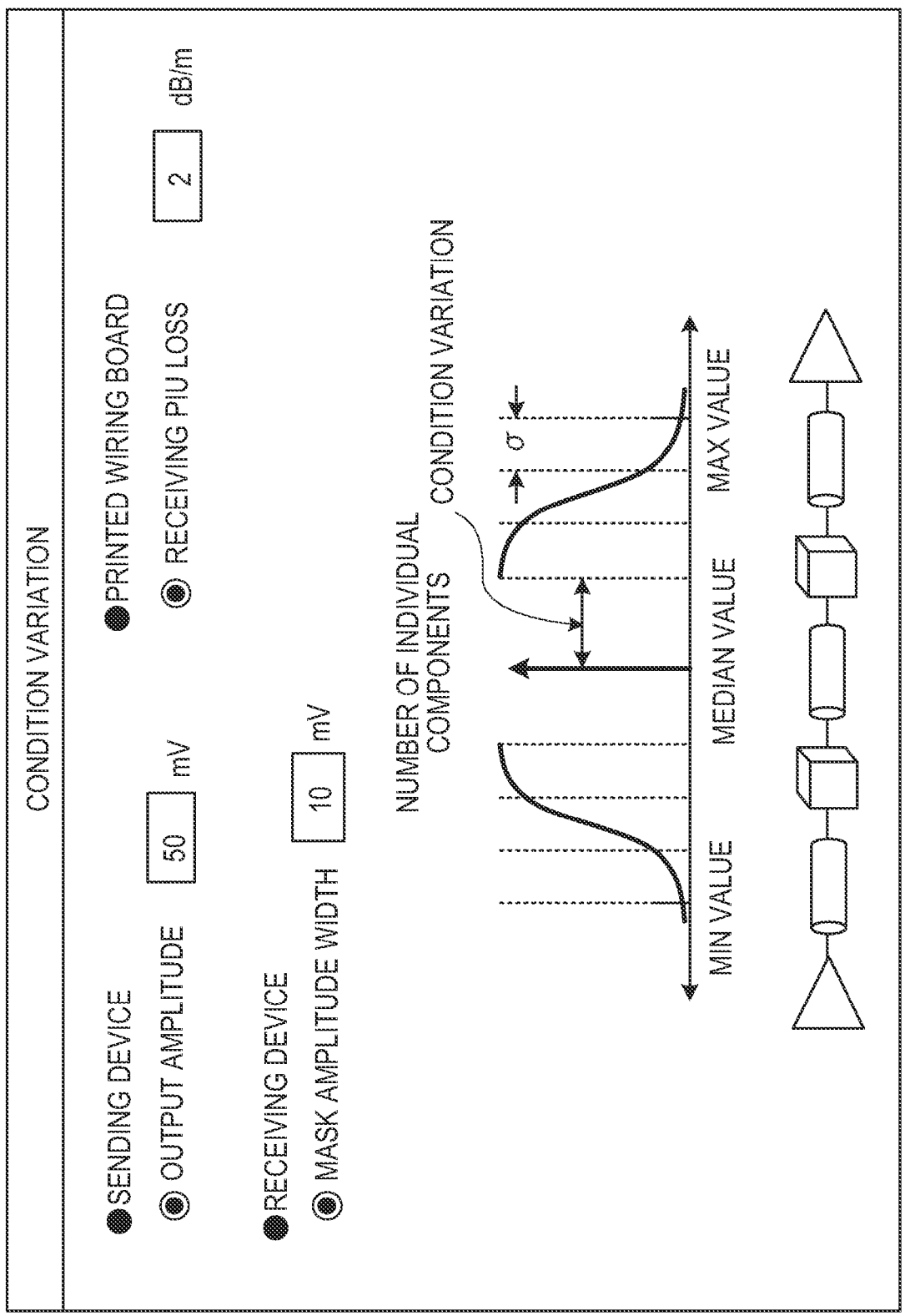
FIG. 8 illustrates a screen indicative of one example of an entry screen for entering a condition variation value(s) according to the embodiment.

FIG. 8 illustrates a screen indicative of one example of the condition variation value entry screen according to the embodiment. The characteristics of the transmission path (such as wirings) change depending on variations in temperatures or in power supply voltages. Such changes are defined as the condition variation values. Since device manufactures do not release such value(s), it is desirable to obtain the value from the device manufacturers or values actually measured by the user are entered as the condition variation values.

Then, the acquisition unit 21 displays an entry screen for entering the number of corresponding on-board components and acquires the number of corresponding on-board components that is entered by the user (S16).

Figure 9:
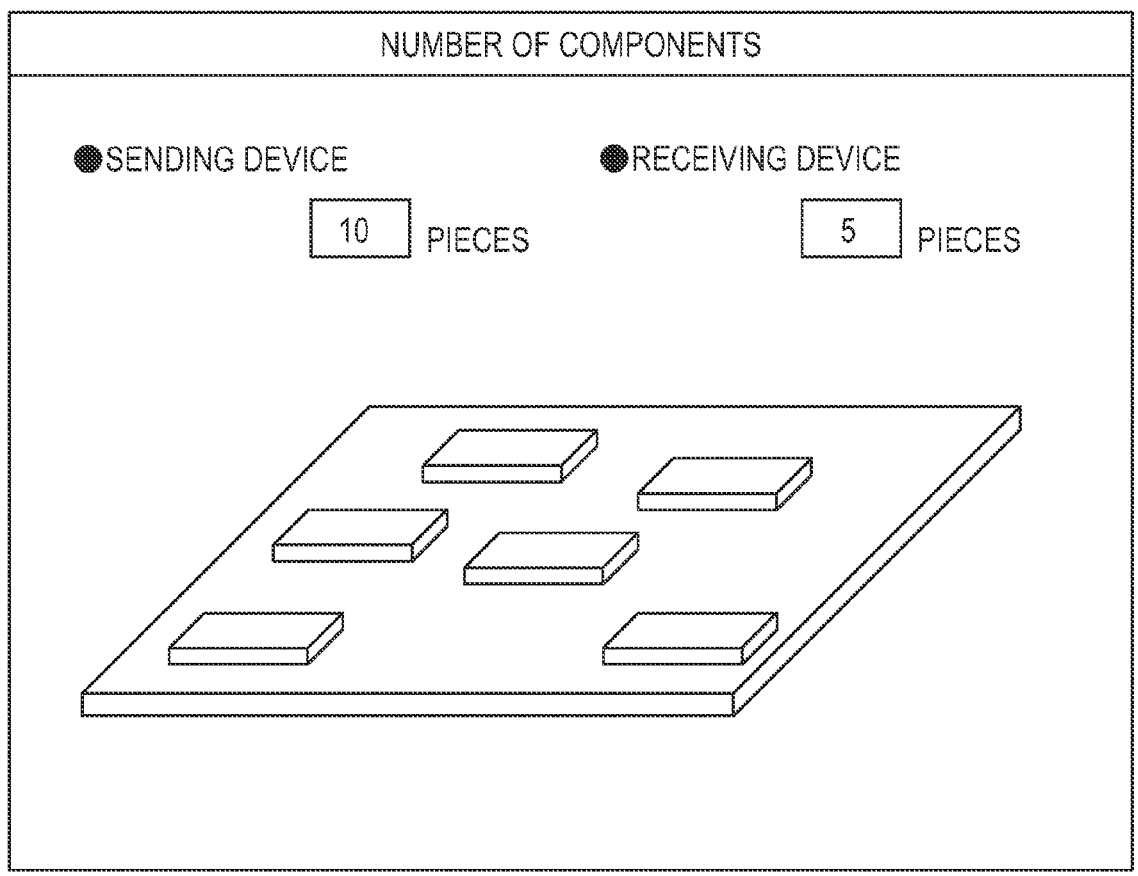
FIG. 9 illustrates a screen indicative of one example of an entry screen for entering the number of on-board components according to the embodiment.

FIG. 9 illustrates a screen indicative of one example of an entry screen for entering the number of on-board components according to the embodiment. The above entry screen receives an entry of the number of on-board components, which is the number of sending and receiving elements mounted on the corresponding printed board. The number of on-board components is used for calculating a yield rate with respect to each printed board.

Then, the acquisition unit 21 transfers the number of on-board components acquired by the process disclosed above, to the control unit 22 as entry information (S21).

Then, the control unit 22 executes a process of improving the predetermined value (hereinafter, referred to as a "predetermined value improvement process") where the control unit 22 improves (makes an adjustment on) the predetermined value with respect to the target item(s) and stores the improved (adjusted) predetermined value as a new predetermined value (S22). Here, the improvement disclosed above is a process where the predetermined value is approximated to the median value of the variation. A high yield rate may be achieved by concurrently improving the predetermined value in a uniform proportion with respect to each of the plural items. To do this, the control unit 22 executes the following operation in the predetermined value improvement process. That is, the control unit 22 stores a value obtained by dividing a difference (range of variation) between a value, that is, [median value+condition variation value] and the predetermined value by a common division number, as a modification step value, with respect to each of the target items. Then, the control unit 22 defines the value thus obtained, as a unit, and improves the predetermined value of the each target item by the modification step value of each of the target items, until an eye-opening margin becomes positive. Finally, the predetermined value thus improved is stored as a new predetermined value.

Figure 10:
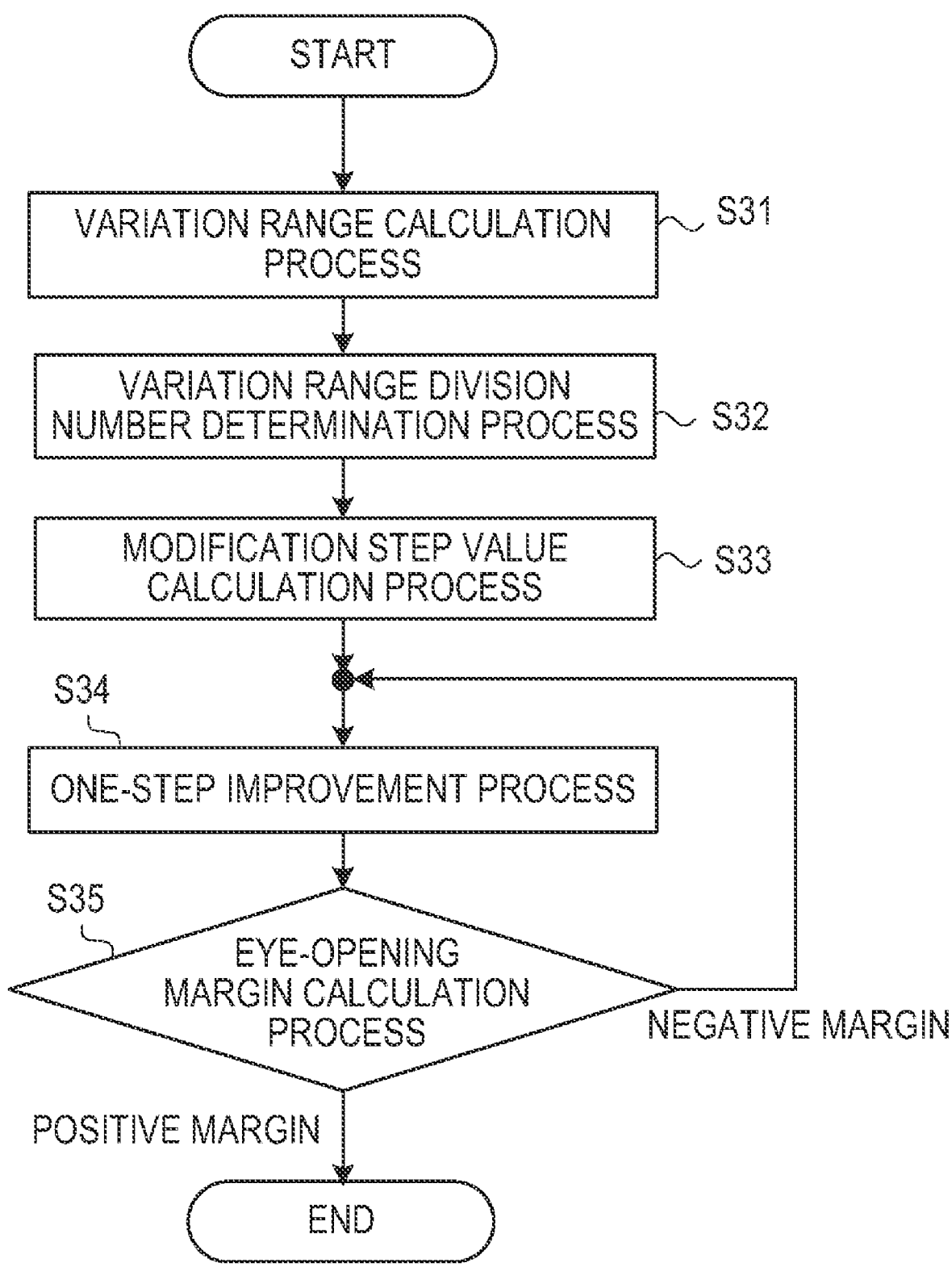
FIG. 10 illustrates a flow chart indicative of one example of a process of improving the predetermined value according to the embodiment.

FIG. 10 illustrates a flow chart indicative of one example of the process of improving the predetermined value according to the embodiment. First, the control unit 22 executes a process of calculating the range of variation where the range of variation for each of the target items is calculated (S31). Next, the control unit 22 executes a process of determining a division number for the range of variation where the common division number for the range of variation is determined (S32). Then, the control unit 22 executes a process of calculating a modification step value where the modification step value with respect to each of the target items is calculated (S33). Thereafter, the control unit 22 executes a process of improving one-step where the predetermined value of each of the target items is improved by the modification step value of each target item (S34).

Next, a waveform simulator 23 calculates the eye-opening margin as a transmission margin and executes a process of calculating the eye-opening margin where a determination of whether the eye-opening margin is positive (positive margin) or not (negative margin) is made (S35). When the eye-opening margin is positive (S35, positive margin), the flow terminates. When the eye-opening margin is not positive (S35, negative margin), the flow returns to a process S34. Note that the eye-opening margin is a distance between a predetermined eye-opening reference area and an eye-opening. If the eye-opening lies outside the eye-opening reference area, the eye-opening margin is positive. On the other hand, if the eye-opening lies inside the eye-opening reference area, the eye-opening margin is negative.

Figure 11:
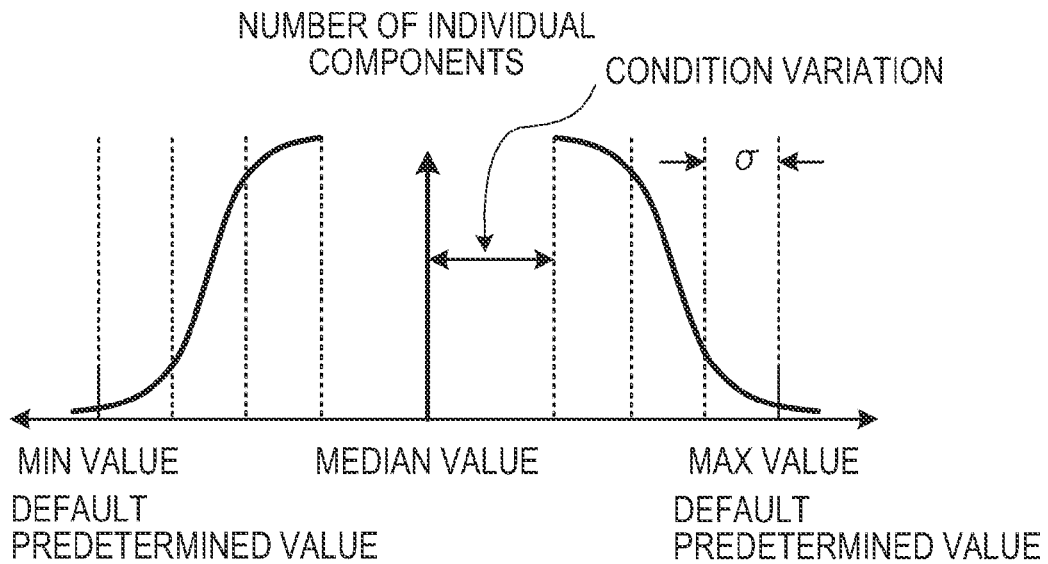
FIG. 11 illustrates a graph indicative of one example of a process of calculating a range of variation according to the embodiment.

FIG. 11 illustrates a graph indicative of one example of a process of calculating the range of variation according to the embodiment. As disclosed in FIG. 11, the range of variation of a certain target item is calculated according to the following equation:

$$\text{range of variation} = \text{predetermined value} - \text{median value} - \text{condition variation}.$$

Figure 12:
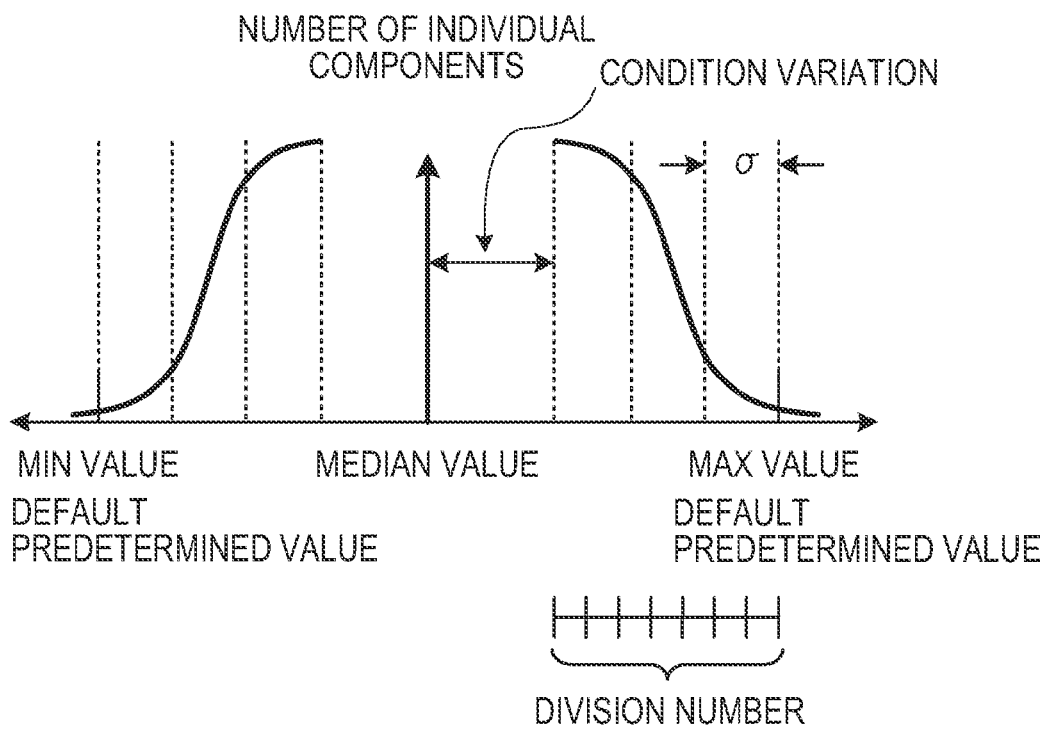
FIG. 12 illustrates a graph indicative of one example of a process of determining a division number for the range of variation according to the embodiment.

FIG. 12 illustrates a graph indicative of one example of a process of determining the division number for the range of variation according to the embodiment. The division number for the range of variation disclosed in FIG. 12 is set by the user, and the division number is common to all of the target items.

Figure 13:
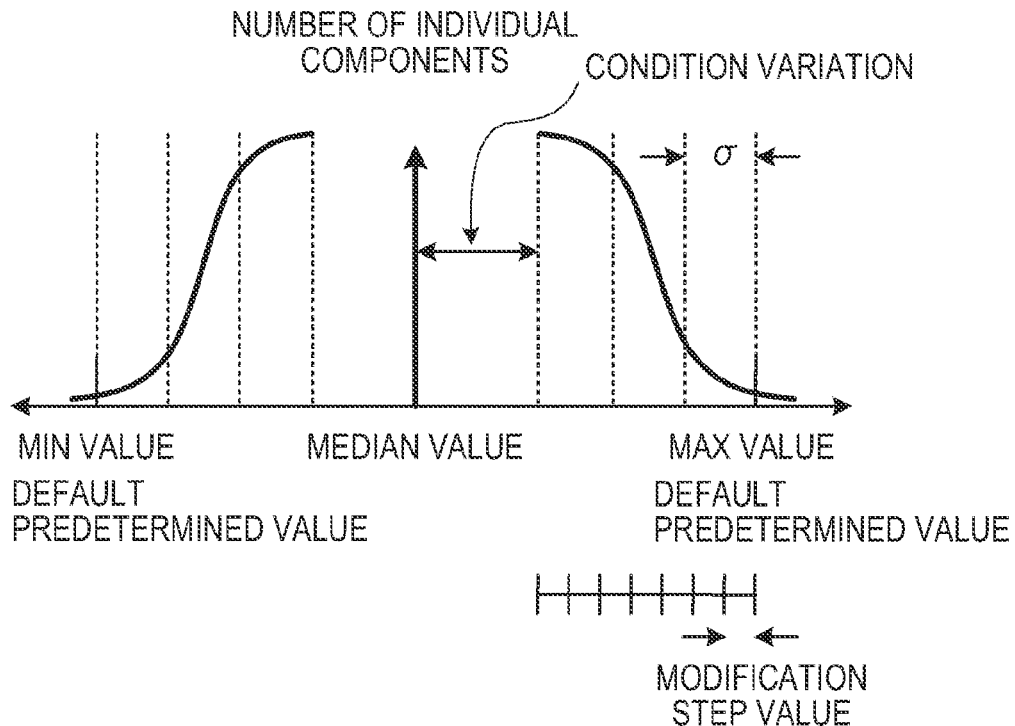
FIG. 13 illustrates a graph indicative of one example of a process of calculating a modification step value according to the embodiment.

FIG. 13 illustrates a graph indicative of one example of the process of calculating the modification step value according to the embodiment. As disclosed in FIG. 13, the modification step value of a certain target item is calculated according to the following equation:

$$\text{modification step value} = \text{range of variation} / \text{division number for range of variation}.$$

Figure 14:
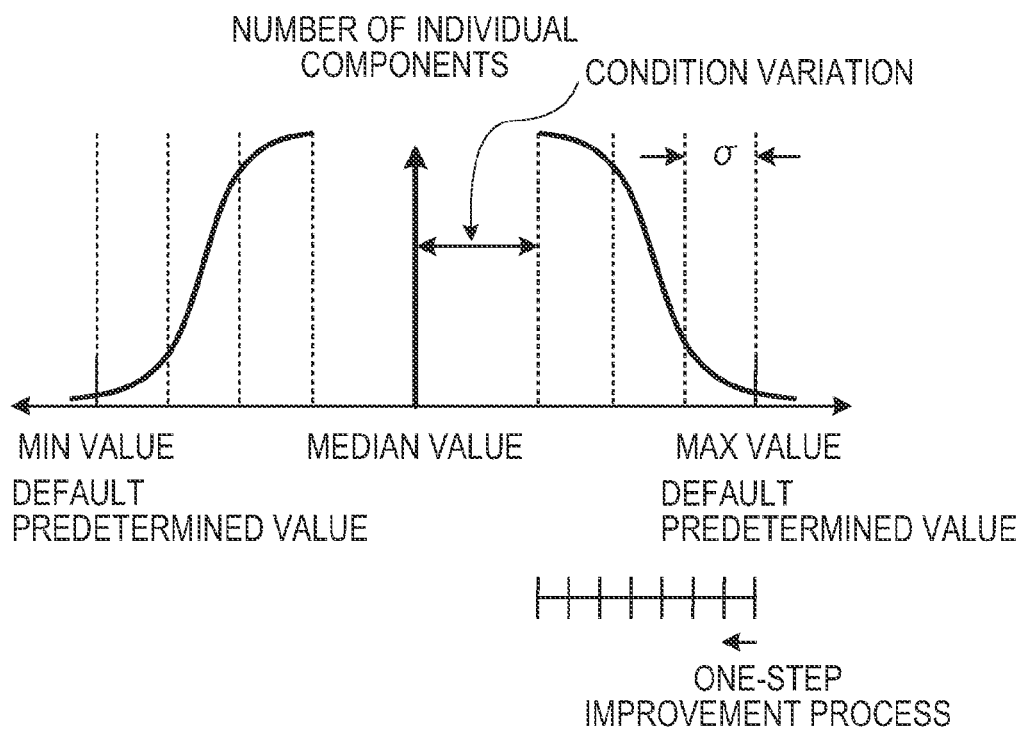
FIG. 14 illustrates a graph indicative of one example of a process of improving one step according to the embodiment.

FIG. 14 illustrates a graph indicative of one example of the process of improving the one-step according to the embodiment. As disclosed in FIG. 14, the predetermined value of each of the target items is improved by the modification step value of the each target item and the predetermined value is stored as a new predetermined value.

Figure 15A:
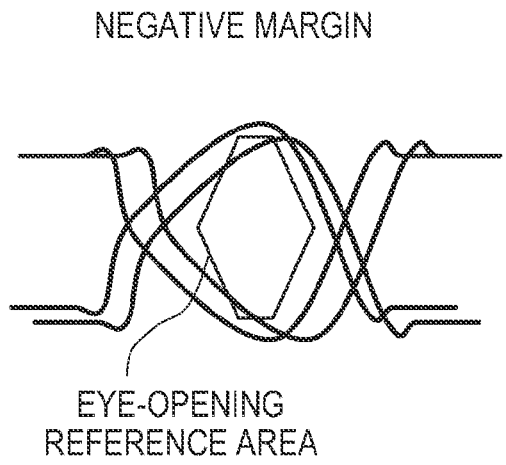
FIG. 15 illustrates a graph indicative of one example of a process of calculating an eye-opening margin according to the embodiment.
Figure 15B:
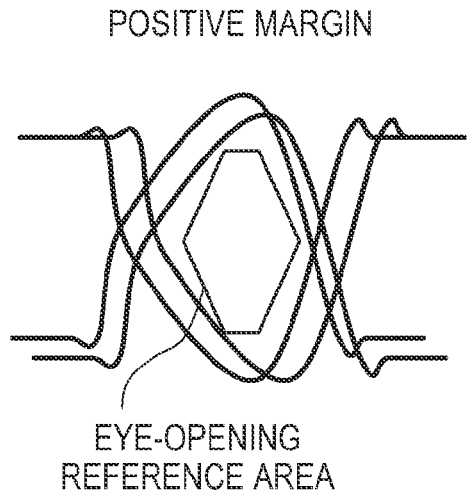

FIG. 15 illustrates a graph indicative of one example of the process of calculating the eye-opening margin according to the embodiment. As disclosed in FIG. 15, the waveform simulator 23 executes a simulation on a received waveform, which is received by the receiving element 12, by using the improved predetermined value and calculates an eye pattern. If the calculated eye pattern lies outside the eye-opening reference area having a predetermined hexagonal shape, (in other words, if the eye pattern does not lie inside the eye-opening reference area at all,) the waveform simulator 23 makes a determination of the "positive margin." On the other hand, if only a portion of the calculated eye pattern lies inside the eye-opening reference area, the waveform simulator 23 makes a determination of the "negative margin." If the determination of the "negative margin" is made, the flow returns to the process of improving the one-step.

Next, the control unit 22 executes a process of calculating a yield rate per item where a yield rate with respect to each of the target items is calculated (S23).

Figure 16:
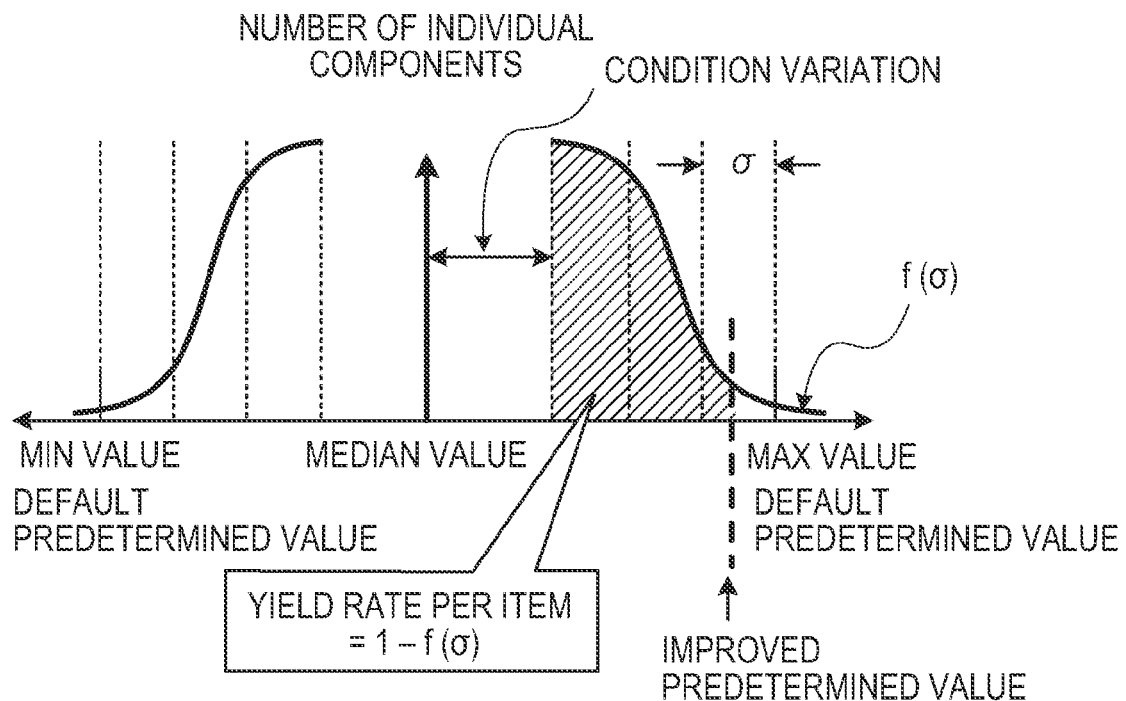
FIG. 16 illustrates a graph indicative of one example of a process of calculating a yield rate per item according to the embodiment.

FIG. 16 illustrates a graph indicative of one example of a process of calculating the yield rate per item according to the embodiment. The control unit 22 stores an existing probability of such components in which the target items satisfy the predetermined values, as the yield rate per item. Then, the control unit 22 calculates a yield rate per item with respect to each of the target items. The method of calculating the yield rate is based on a premise well known to manufacturers. The premise is that a variation represents a normal distribution. The yield rate is calculated according to the following equation:

$$\text{yield rate} = 1 - f(n1 \times \sigma);$$

where $n1$ = variation coefficient − (default predetermined value − predetermined value)/$\sigma$.

"$f(\sigma)$" is a function that represents an existing probability of an area based on a curve of the normal distribution. The function is incorporated in commonly used spreadsheet software.

Next, the control unit 22 executes a process of calculating a yield rate per component pair (S24) where a yield rate of one pair of components (a pair of sending element and receiving element) is calculated.

Figures 17, 18:
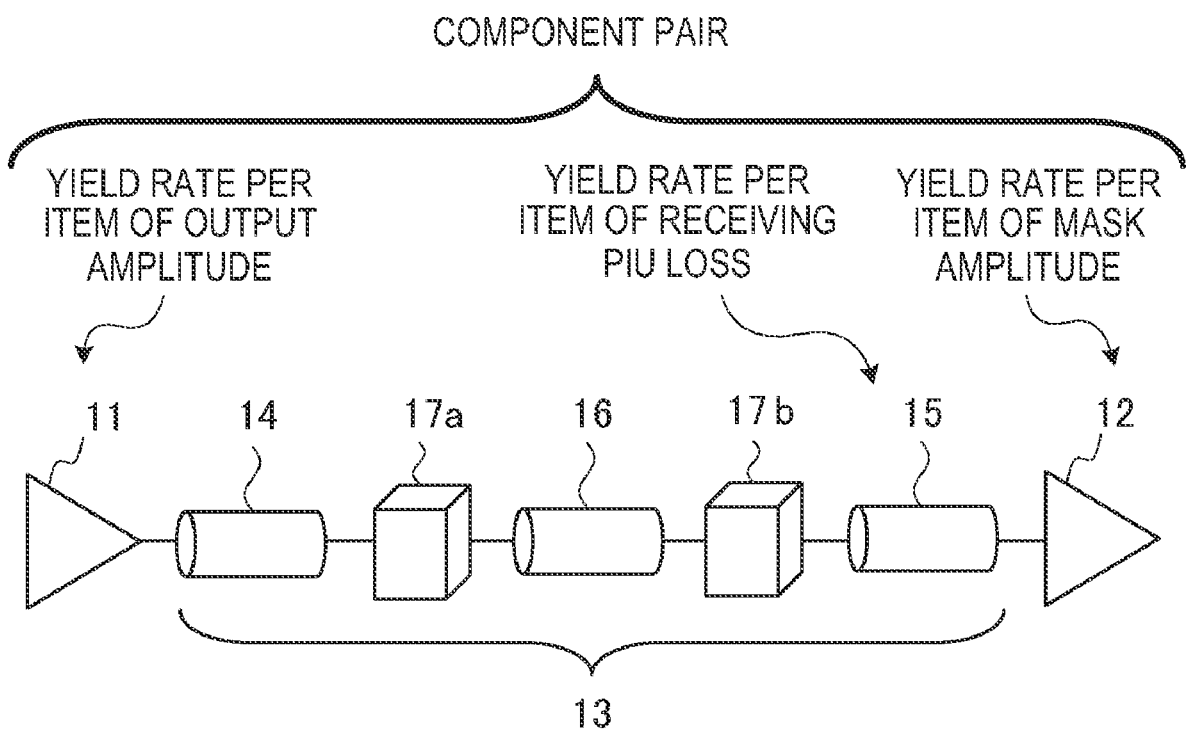
FIG. 17 illustrates a schematic indicative of one example of a process of calculating a yield rate per component pair according to the embodiment.
FIG. 18 is a table indicative of one example of a calculation result based on a process of selecting the target item with reference to a rate of the range of variation according to the embodiment.

FIG. 17 illustrates a schematic indicative of one example of the process of calculating the yield rate per component pair according to the embodiment. Satisfying requirements for all of the target items allows the signal transmission of the one pair of components without error. In consequence, yield rate per component pair is defined by multiplying every "yield rate per item" in the one pair of components. Note that a defective rate is obtained by (1−yield rate). The following equation is one example thereof:

$$\text{yield rate per component pair} = \text{yield rate per item of output amplitude} \times \text{yield rate per item of receiving PIU loss} \times \text{yield rate per item of mask amplitude}.$$

Next, the control unit 22 executes a process of calculating a yield rate of the printed board where the yield rate of the printed board is indicative of a yield rate with respect to each printed board (signal transmission system) is calculated (S25), and the flow terminates.

Here, the control unit 22 calculates the yield rate of printed board based on the yield rate per component pair. The following equation represents a detailed calculation:

$$(\text{yield rate of printed board}) = (\text{yield rate per component pair}) \times (\text{the number of on-board component pairs mounted on the target printed board});$$

where (the number of on-board component pairs) = (the number of sending devices + the number of receiving devices)/2.

Here, the number of sending devices and the number of receiving devices are the value obtained as the number of on-board components.

Hereinafter, an adding function of the evaluation apparatus for evaluating the signal transmission system will be disclosed.

Hereinafter, a process of selecting the target item with reference to a rate of the range of variation will be disclosed.

When the target item disclosed above is selected, the user selects the item (target item) having the characteristic, which serves as the target of the calculation of the yield rate, on the target item selection screen. Different from the selection of the target item made by the user, the process of selecting the target item is executed where the control unit 22 selects the target item based on a predetermined rule. Use of this method allows the yield rate calculation with reduced variation among different users to be achieved.

The rule for selecting the target item(s) is that any number of target items is selected in descending order from the maximum rate of the range of variation. When it comes to the target items having a wider range of variation, the number of components falling outside the improved predetermined value is less with reference to an amount of the improvement of the predetermined value. Thus, an advantageous result may be obtained by the yield rate calculation based on this rule. A comparison among the items may be achieved by defining a ratio of the range of variation relative to the median value as the rate of the range of variation. The rate of the range of variation for each of the items may be obtained according to the following equation:

rate of range of variation=range of variation/median value×100[%].

When it comes to the number of target items, a calculation program stores default values, and the user changes the number as necessary.

FIG. 18 is a table indicative of one example of a calculation result of the process of selecting the target item based on the rate of the range of variation according to the embodiment. In this example, the rate of the range of variation is calculated with respect to four (4) items. If two target items are selected, the first and the second items (that is, the output amplitude and the output jitter, in FIG. 18) are selected as the target items.

Hereinafter, a process of optimizing a modification step value will be disclosed.

In the process of improving the predetermined value disclosed above, the modification step value is obtained in the following manner. That is, first, the division number for the range of variation is defined to obtain the step value in improving the predetermined value, and the range of variation is equally divided by the division number. In the above case, if the predetermined value of a certain item having high sensitivity relative to the eye-opening margin is improved, one step is excessive relative to an increase/decrease in the eye-opening margin, and there is a possibility that this excessive step results in the yield rate calculation on the basis of an excessive eye-opening margin.

To solve the above problem, the control unit 22 defines a margin tolerance that is an allowable range of an error relative to the eye-opening reference area, and the control unit 22 executes the process of optimizing the modification step value where the modification step value is gradually reduced so that the eye-opening margin falls within this margin tolerance. Use of this process of optimizing the modification step value is capable of effectively reducing the excessive eye-opening margin, so that advantageous results may be achieved in calculating the yield rate.

Figure 19:
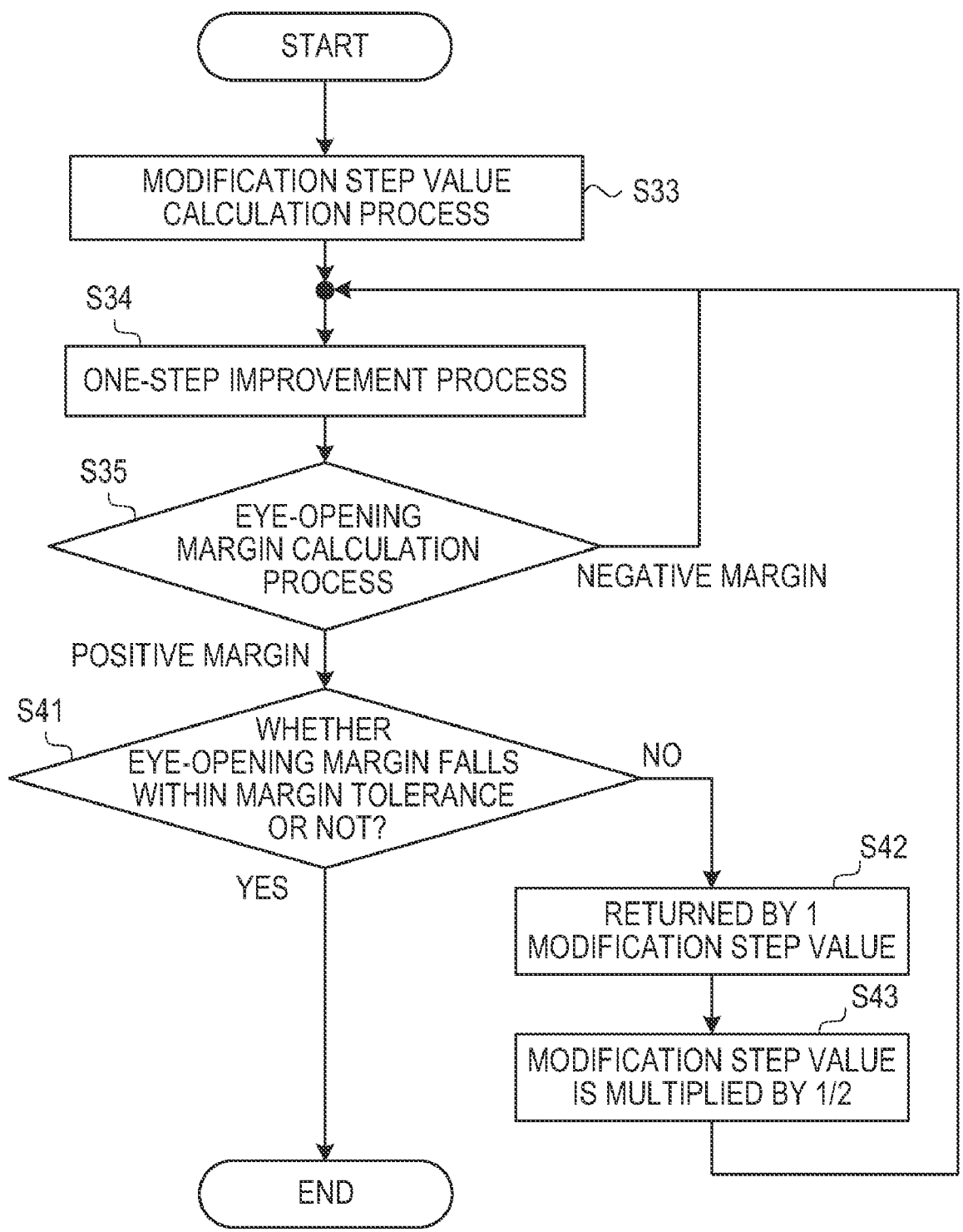
FIG. 19 is a flow chart indicative of one example of a process of optimizing the modification step value, according to the embodiment.

FIG. 19 illustrates a flow chart indicative of one example of the process of optimizing the modification step value according to the embodiment. First, the control unit 22 and the waveform simulator 23 execute a process S33, a process S34, and a process S35 in the process of improving the predetermined value disclosed above. If the calculated eye-opening margin indicates the negative margin (S35, negative margin), the flow returns to the process S34. If the calculated eye-opening margin indicates the positive margin (S35, positive margin), the control unit 22 makes a determination on whether the eye-opening margin falls within the margin tolerance or not (S41).

If the eye-opening margin falls within the margin tolerance (S41, YES), this flow terminates. If the eye-opening margin falls outside the margin tolerance (S41, NO), the predetermined value is turned back by the modification step value (S42), and the modification step value is multiplied by ½ (S43), thereafter this flow returns to the process S34.

Hereinafter, a process of improving the predetermined value for the output jitter(s) will be disclosed where an error rate is used.

In the example of the predetermined value disclosed above, a parameter entered as the output jitter is a total jitter (Tj). Here, Tj is classified as a deterministic jitter (Dj) and as a random jitter (Rj), and each of the both jitters is entered as the predetermined value, so that an aspect of the error rate may be introduced into the yield rate calculation. If the process of improving the predetermined value is applied to such a product for which a certain degree of error rate may be allowable, the transmission path highly susceptible to transmission loss may be used for transmission by virtue of introducing the aspect of the error rate. Thus, advantageous results may be achieved in calculating the yield rate.

Figure 20:
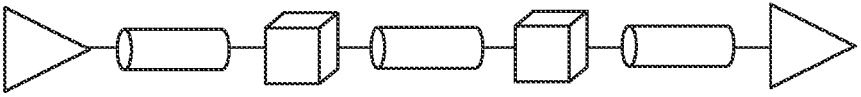
FIG. 20 illustrates a screen indicative of one example of an output jitter(s) on the entry screen used for entering the predetermined value(s), according to the embodiment.

FIG. 20 illustrates a screen indicative of one example of the output jitter(s) on the predetermined value entry screen according to the embodiment. The user enters an allowable error rate as the parameter, and the control unit 22 improves the predetermined value of the Rj on the basis of the parameter. The Rj represents a normal distribution when a histogram is formed based on the time period in which an edge of the Rj itself exists. The predetermined value of the Rj is determined based on a range of variation $n\sigma$. Note that the range of variation $n\sigma$ may be obtained by multiplying a variation coefficient n corresponding to an error rate (reference setting error rate) assumed in setting the default predetermined value and the standard deviation $\sigma$. The variation coefficient n corresponding to this error rate may be obtained by setting the allowable error rate. The variation coefficient n corresponding to the error rate may be calculated by functions (function of normal distribution) found in commercially available spread sheet software. The predetermined value of the Rj may be calculated according to the following equation:

predetermined value=default predetermined value× variation coefficient in allowable error rate/variation coefficient of default predetermined value.

Here, the variation coefficient of the allowable error rate may be obtained by using the functions of normal distribution (allowable error rate), and the variation coefficient of the default predetermined value may be obtained by using the functions of the normal distribution (error rate assumed in default predetermined value).

Hereinafter, a process of selecting the target item where a sensitivity analysis is used will be disclosed.

In the above example, the user selects the target item for the yield rate calculation. Different from the selection of the target item(s) by the user, the process of selecting the target item is executed where the control unit 22 selects the target item(s) based on the sensitivity analysis. This method allows the yield rate calculation with less variation among different users. As a result, optimum results may be achieved in the yield rate calculation.

Figures 21, 22:
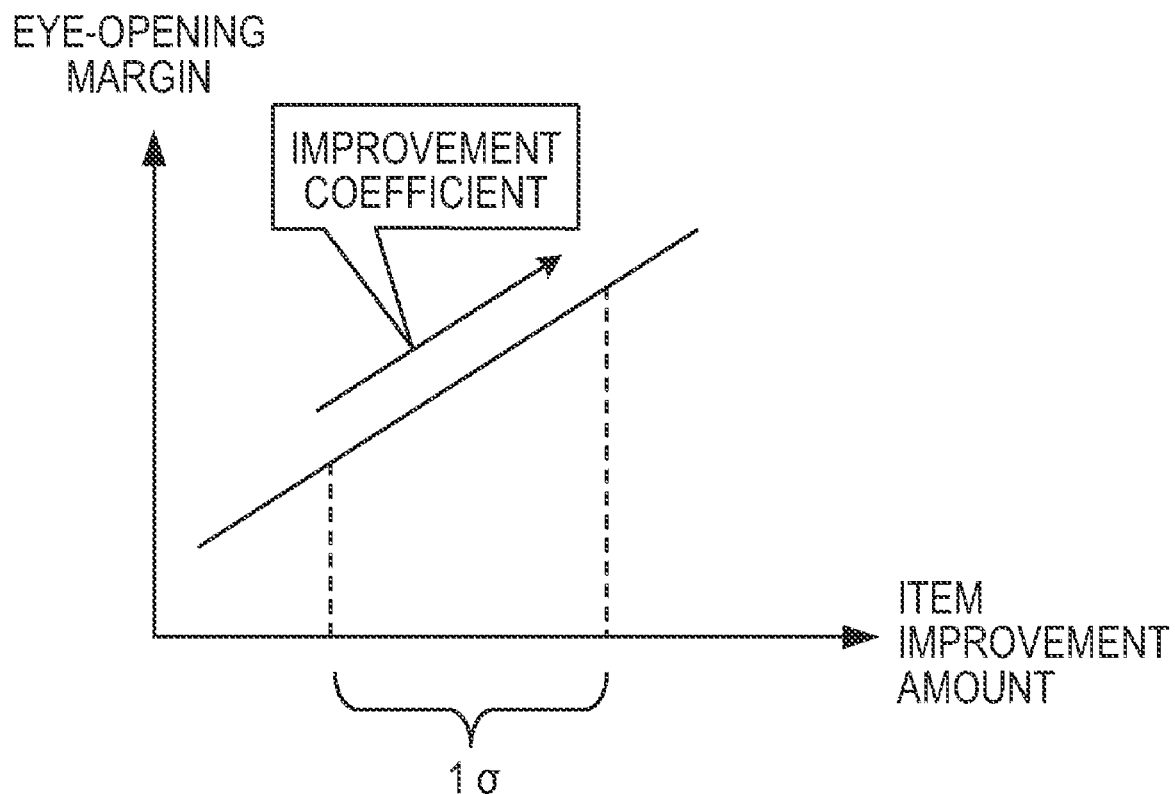
FIG. 21 illustrates a graph indicative of one example of an improvement coefficient calculated based on a sensitivity analysis, according to the embodiment.
FIG. 22 is a table indicative of one example of a calculation result based on a process of selecting the target item where the sensitivity analysis according to the embodiment is used.

The sensitivity analysis is executed by obtaining improvement coefficients of the eye-opening margin in a case where each of the items is improved and by comparing the obtained improvement coefficients among the items. FIG. 21 illustrates a graph indicative of one example of the improvement coefficient calculated by the sensitivity analysis according to the embodiment. FIG. 21 indicates a relationship among an item improvement amount that is an amount of improvement of the predetermined value of the item, an eye-opening margin improvement amount that is an amount of improvement of the eye-opening margin, and the improvement coefficient. The improvement coefficient is represented by an eye-opening margin improvement amount corresponding to a given item improvement amount $1\sigma$. Here, a variation coefficient m, which is obtained by dividing a given item improvement amount $m\sigma$ by $\sigma$, is defined as an item improvement variation coefficient. The improvement coefficient may be obtained according to the following equation:

improvement coefficient=eye-opening margin improvement amount/item improvement variation coefficient.

FIG. 22 is a table indicative of one example of a calculation result of the process of selecting the target item (where the sensitivity analysis is used) according to the embodiment. If the calculations on the improvement coefficients of four (4) target items are performed and if two of the four target items are set in advance, the output amplitude and the output jitter [that is, the first and the second items (sensitivity condition) in the improvement coefficients] are selected as the target items.

Hereinafter, a process of achieving a high degree of accuracy in a probability calculation(s), which is executed after calculating the yield rate of the printed board, will be disclosed.

In the above example, only a combination(s) of individual components, which satisfies the improved predetermined value with respect to each of the items, is counted as a "nondefective." However, bit errors seldom occur if any of the individual components include a component(s) that satisfies the improved predetermined value. In consequence, advantageous results may be achieved in a probability calculation by accurately calculating a probability of a particular combination among the component combinations where the bit errors do not occur and by adding it to the yield rate disclosed above. More specifically, a calculation is made on the basis of an existing probability of components having good characteristics capable of securing the margins even in a combination where the component unable to satisfy the improved predetermined value is combined with the other components.

Figure 23:
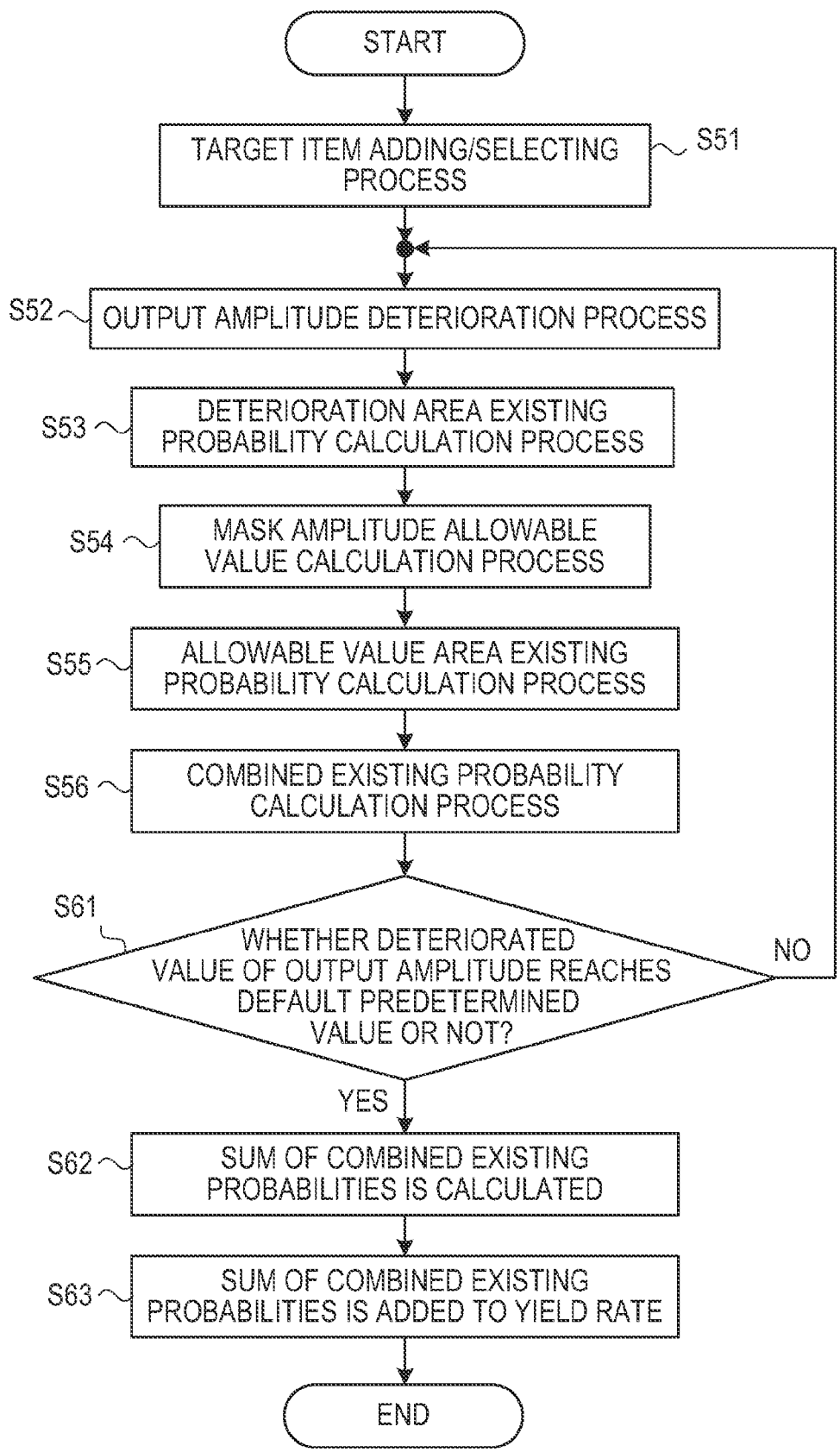
FIG. 23 illustrates a flow chart indicative of one example of a process of achieving a high degree of accuracy in a probability calculation(s), according to the embodiment.

FIG. 23 illustrates a flow chart indicative of one example of the process of achieving the high degree of accuracy in the probability calculation(s) according to the embodiment.

Figure 24:
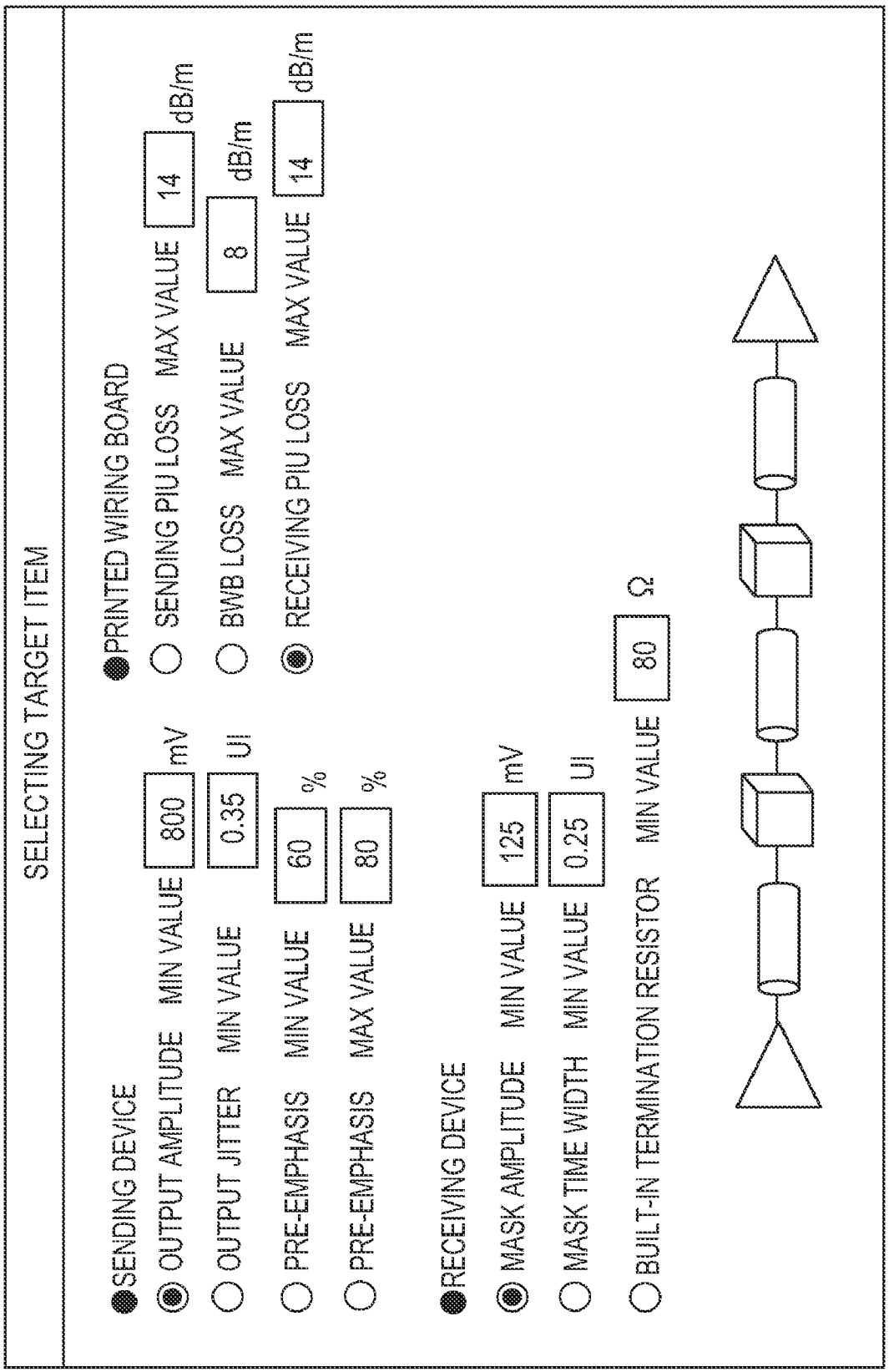
FIG. 24 illustrates a screen indicative of one example of a process of adding/selecting the target item(s), according to the embodiment.

First, the control unit 21 displays the target item selection screen and executes a process of adding/selecting the target item (S51) where the target item selection screen receives a selection of the target item by the user. FIG. 24 illustrates a screen indicative of one example of the process of adding/selecting the target item(s) according to the embodiment. Here, two items, that is, the output amplitude (first characteristic value) of the sending element and the mask amplitude (second characteristic value) of the receiving element, are selected in addition to the target items selected in the process S12.

Figure 25:
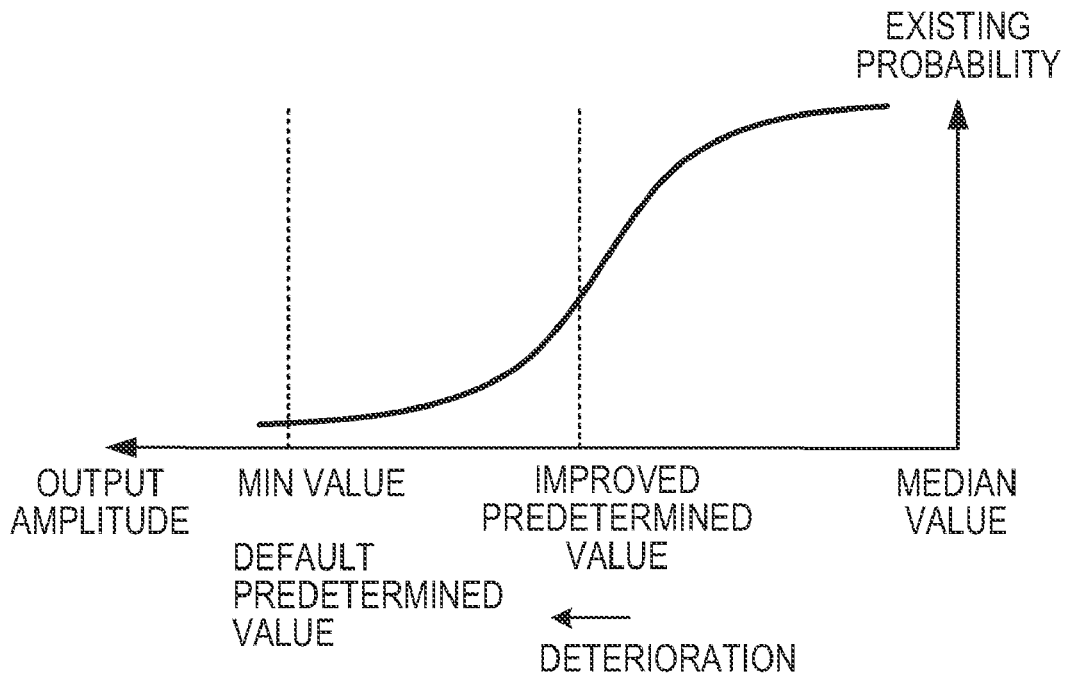
FIG. 25 illustrates a graph indicative of one example of a process of deteriorating output amplitude, according to the embodiment.

Next, the control unit 22 executes a process of deteriorating output amplitude (S52) where a predetermined value of the output amplitude is deteriorated by the modification step value and stored as a deteriorated value. FIG. 25 illustrates a graph indicative of one example of the process of deteriorating the output amplitude according to the embodiment. Here, the "deterioration" is a process where a process opposite to the "improvement" is performed. More specifically, the "deterioration" is a process where a value is defined as a new deteriorated value by being displaced by the modification step value toward a side of the predetermined value or the deteriorated value from the median value.

Figure 26:
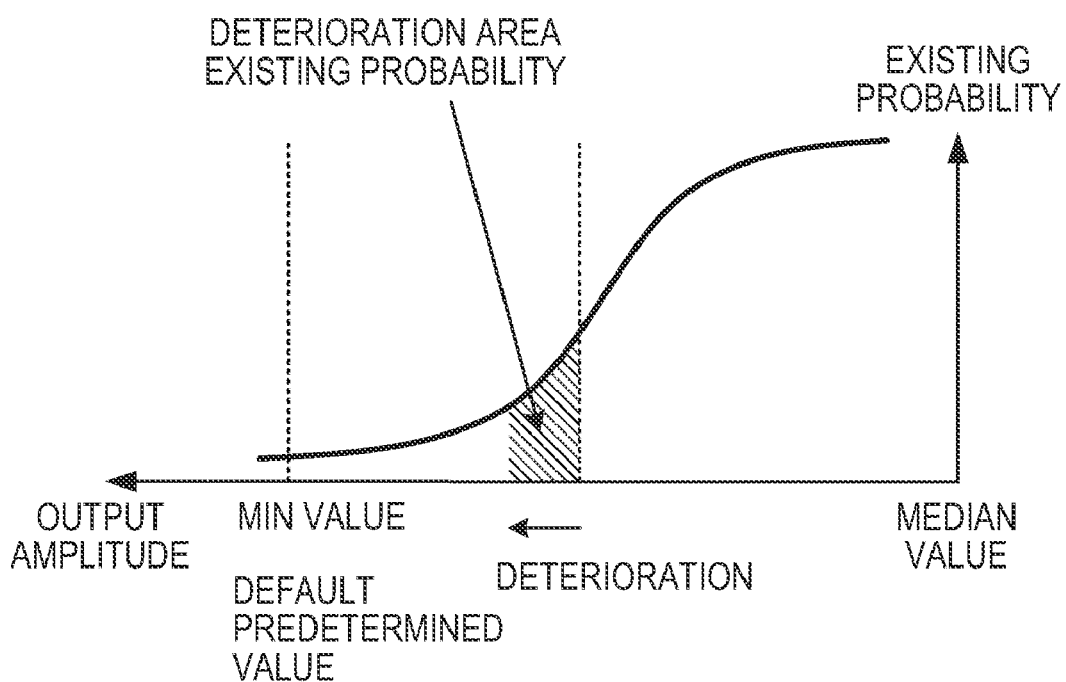
FIG. 26 is a graph indicative of one example of a process of calculating a deterioration area existing probability, according to the embodiment.

Next, the control unit 22 executes a process of calculating a deterioration area existing probability (S53) where an existing probability of a deterioration area is calculated. The deterioration area existing probability is an existing probability of the individual components whose output amplitude falls within the deterioration area. FIG. 26 illustrates a schematic indicative of one example of the process of calculating the deterioration area existing probability according to the embodiment. Here, the deterioration area is an area between the predetermined value or a deteriorated value before deterioration and the deteriorated value after deterioration. The calculation may be executed by using statistic functions included in the commercially available spreadsheet software.

Figure 27:
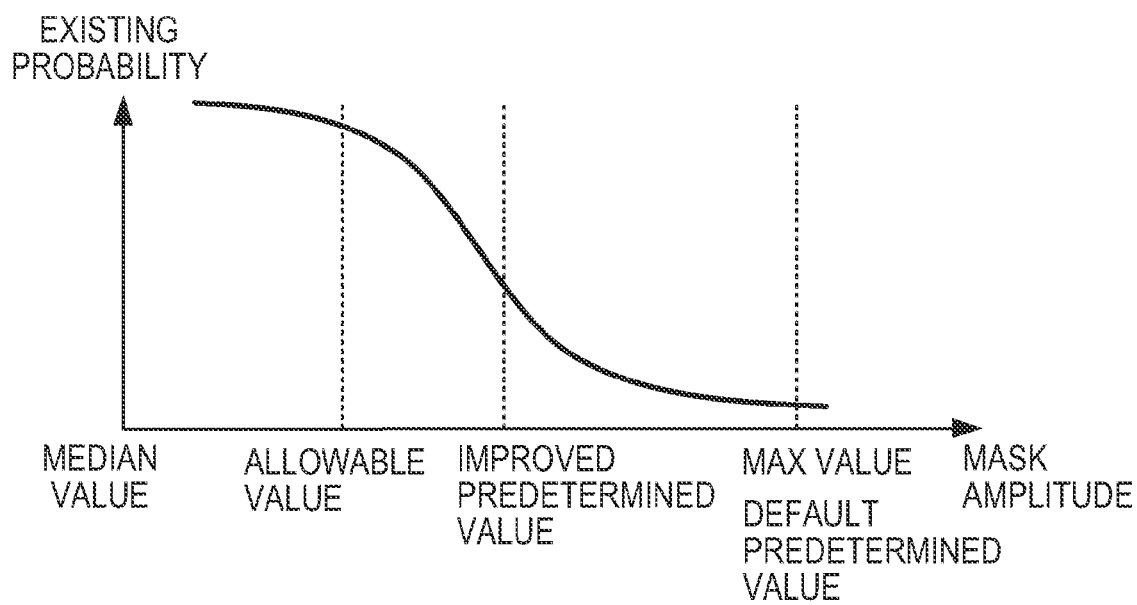
FIG. 27 is a graph indicative of one example of a process of calculating an allowable value for mask amplitude, according to the embodiment.

Next, the control unit 22 executes a process of calculating an allowable value for the mask amplitude where the allowable value for the mask amplitude is calculated (S54). FIG. 27 illustrates a graph indicative of one example of the process of calculating the allowable value for the mask amplitude according to the embodiment. Here, the control unit 22 obtains the mask amplitude in which the eye-opening margin becomes the positive margin relative to the deteriorated value of the output amplitude, and the control unit 22 defines the mask amplitude thus obtained as the allowable value. The allowable value is approximated to the median value (rather than/as?) the predetermined value of the improved mask amplitude.

Figure 28:
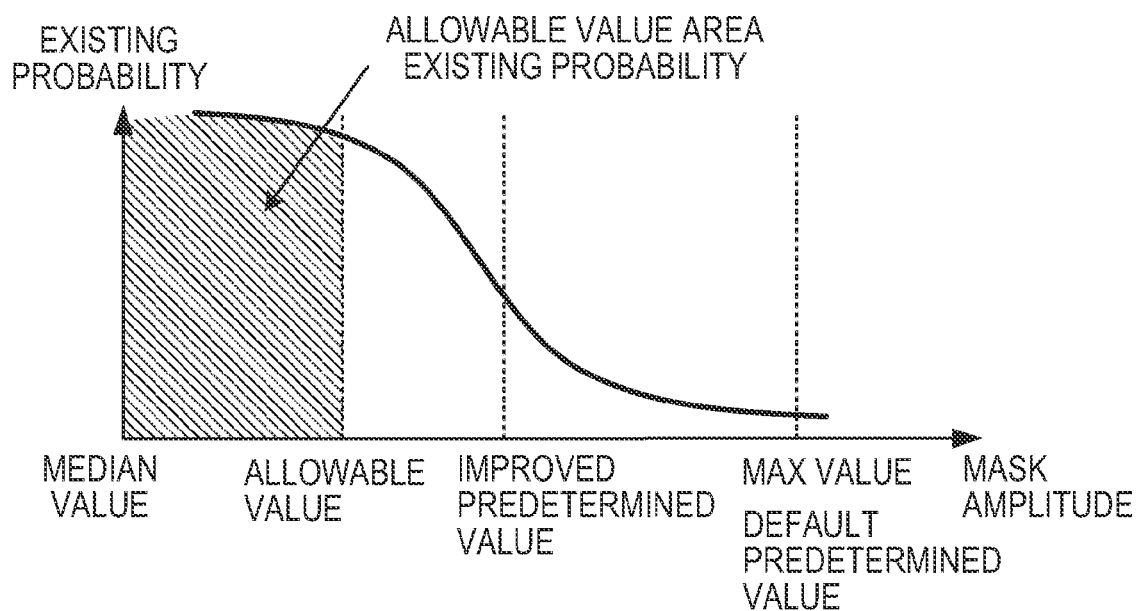
FIG. 28 is a graph indicative of one example of a process of calculating an allowable value area existing probability, according to the embodiment.

Then, the control unit 22 executes a process of calculating an allowable value area existing probability where the existing probability of an allowable value area is calculated (S55). The "allowable value area existing probability" is an existing probability of the individual components whose mask amplitude falls within the allowable value area. FIG. 28 illustrates a graph indicative of one example of the process of calculating the allowable value area existing probability according to the embodiment. Here, the allowable value area is an area between the allowable value and the median value.

Then, the control unit 22 executes a process of calculating a combined existing probability where the combined existing probability is calculated (S56). The "combined existing probability" is an existing probability of the individual products that do not cause bit errors by virtue of the combination of the output amplitude and the mask amplitude. Here, the combined existing probability is calculated according to the following equation:

combined existing probability=deterioration area existing probability×allowable value area existing probability.

Then, the control unit 22 makes a determination on whether the deteriorated value of the output amplitude has reached the default predetermined value or not (S61). If the deteriorated value of the output amplitude does not reach the default predetermined value (S61, NO), the flow returns to the process S52. If the deteriorated value of the output amplitude reaches the default predetermined value (S61, YES), the control unit 22 calculates the sum of the combined existing probabilities (S62). Then, the sum of the combined existing probabilities is added to the yield rate disclosed above (S63), and the flow terminates.

Figure 29:
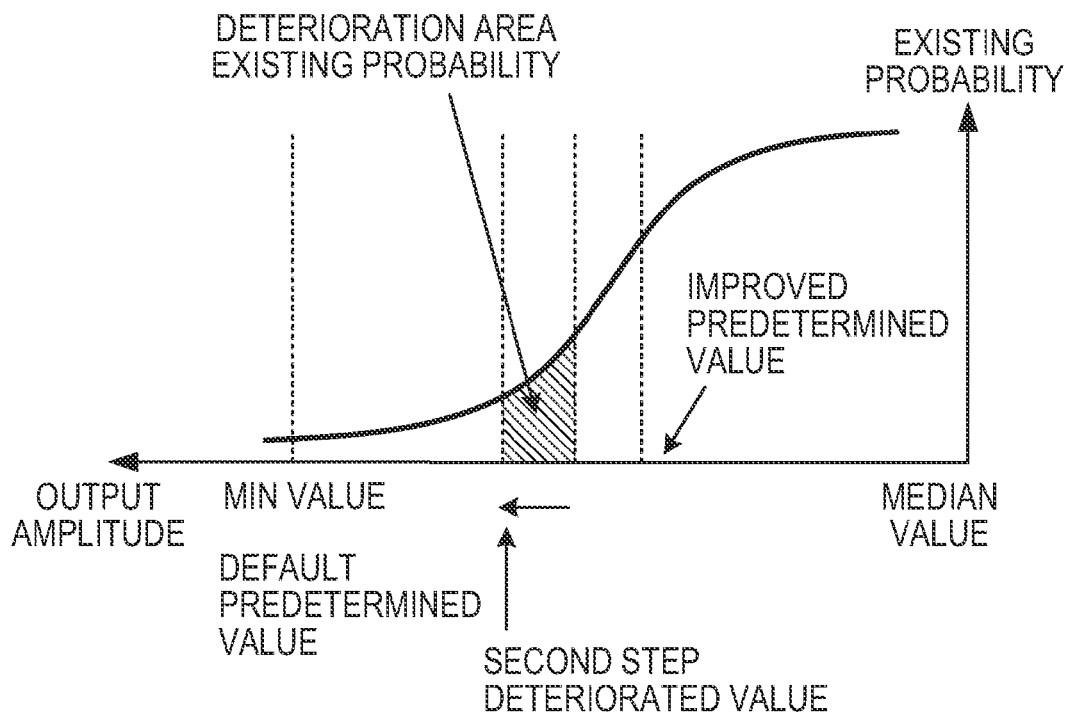
FIG. 29 is a graph indicative of one example of a process (for a second time) of calculating the deterioration area existing probability according to the embodiment.
Figure 30:
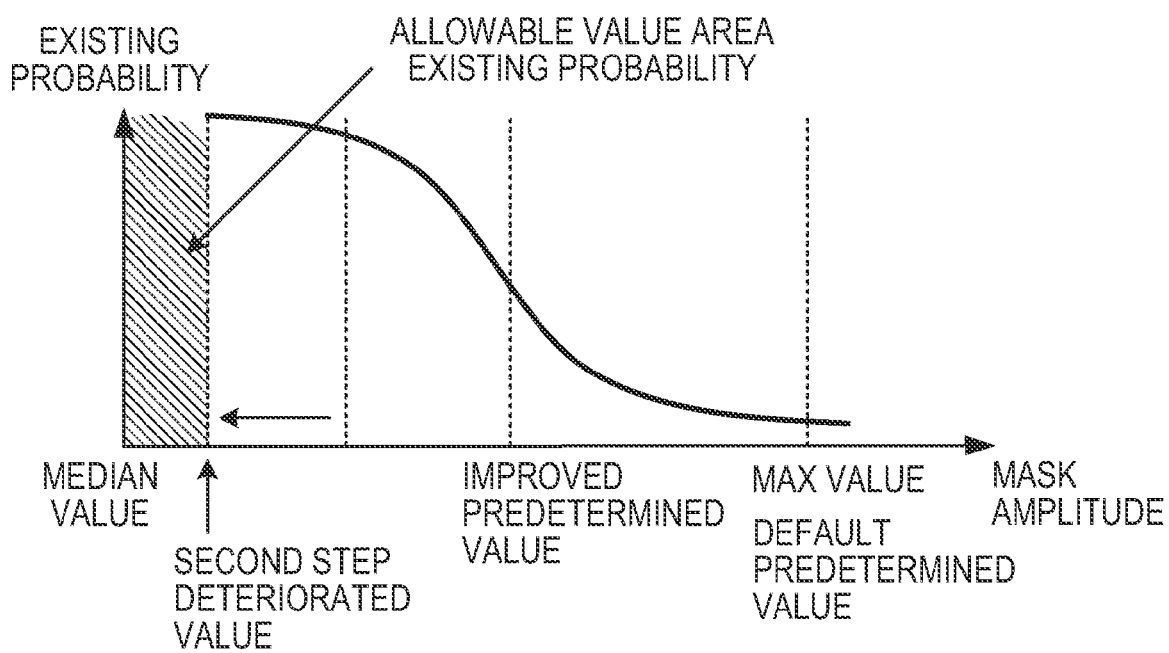
FIG. 30 is a graph indicative of one example of a process (for a second time) of calculating the allowable value for the mask amplitude, according to the embodiment.

As disclosed above, the processes S52 through S56 are repeated until the deteriorated value of the output amplitude reaches the default predetermined value. FIG. 29 illustrates a graph indicative of one example of a process (for a second time) of calculating the deterioration area existing probability according to the embodiment. A deteriorated value of a second time is further displaced from the median value in comparison with the deteriorated value of the first time. FIG. 30 illustrates a graph indicative of one example of a process (for a second time) of calculating the allowable value for the mask amplitude according to the embodiment. An allowable value of a second time is closer to the median value than the first allowable value.

Hereinafter, a process of calculating a profit, executed after calculating the yield rate of the printed board, will be disclosed.

Figure 31:
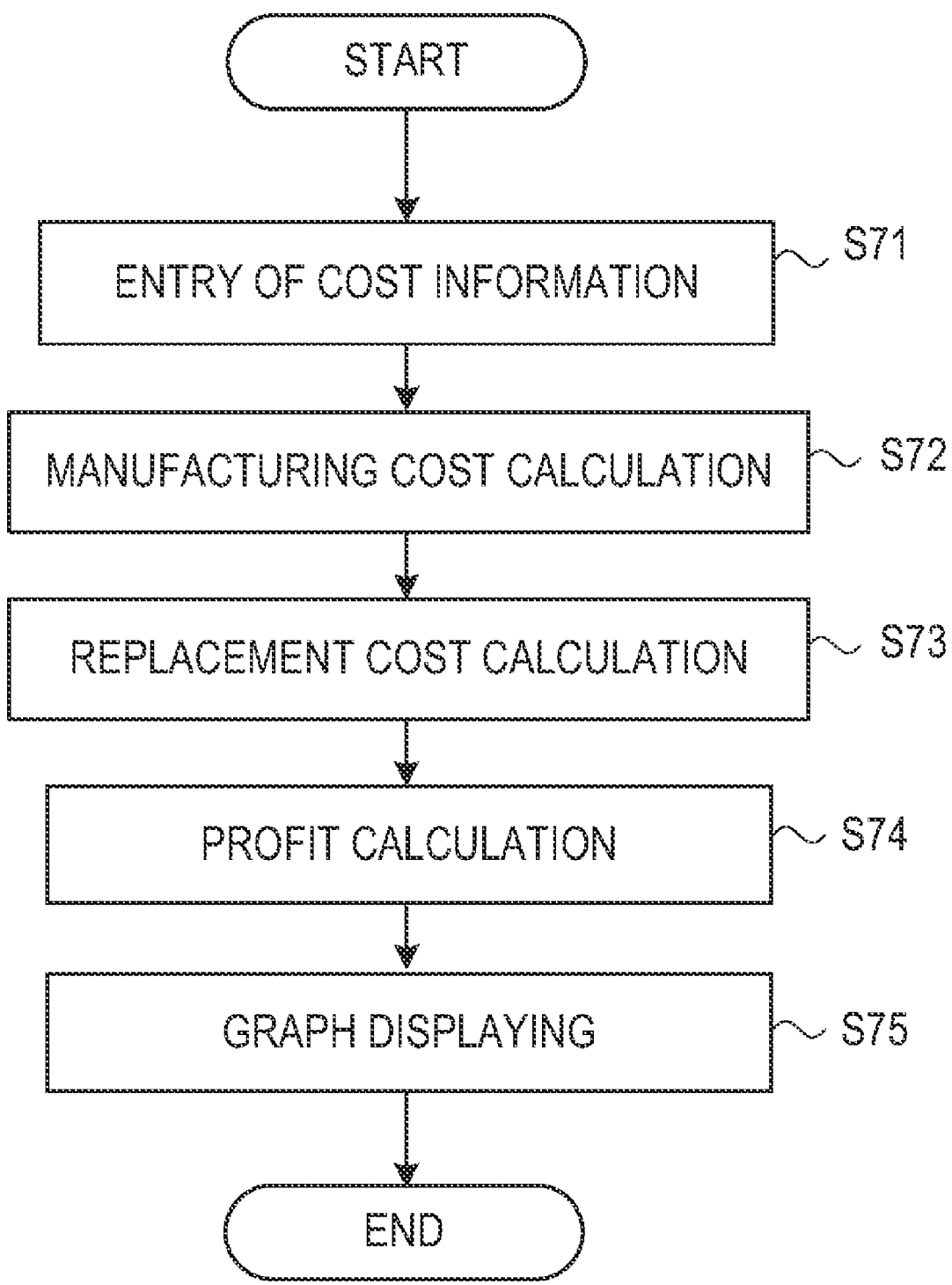
FIG. 31 is a flow chart indicative of one example of a process of calculating a profit, according to the embodiment.

In developing an actual signal transmission system, a profit is calculated based on the calculated yield rate, and a determination on whether the profit is allowable or not is made. Higher efficiency may be achieved with the process of calculating the profit further executed by the evaluation apparatus for evaluating the signal transmission system disclosed above. In addition, it is possible to compare the profits where expensive components with good characteristics are used to the profits where cheap components with bad characteristics are used, so that cost analyses may be facilitated. FIG. 31 illustrates a flow chart indicative of one example of the process of calculating the profit according to the embodiment.

First, the control unit 22 displays an entry screen for entering cost information (hereinafter, referred to as a "cost information entry screen"), and the control unit 22 executes an entry process of entering the cost information (S71) where the cost information entered by the user is received.

Figure 32:
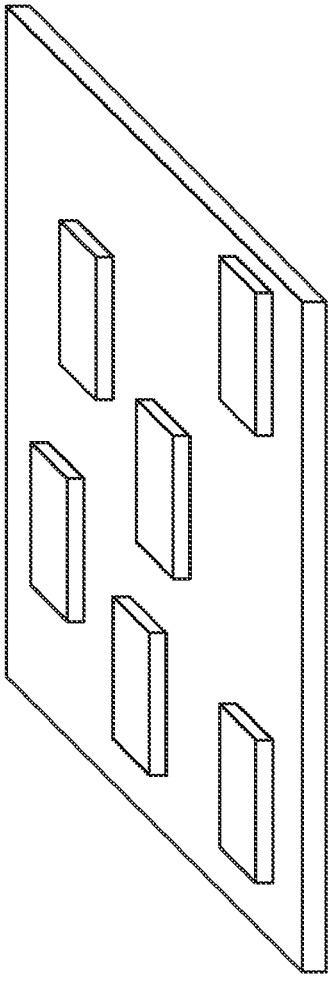
FIG. 32 illustrates a screen indicative of one example of an entry screen for entering cost information, according to the embodiment.

FIG. 32 illustrates a screen indicative of one example of the cost information entry screen according to the embodiment. Here, the user enters parameters for the cost information for calculating the profit. The items for the cost information include a development cost, a cost for the printed board, a price of the target component, a cost for component repair, a cost for replacing the product, a retail price, and the expected number of sales.

Next, the control unit 22 calculates a manufacturing cost (S72). The manufacturing cost may be calculated according to the following equation:

manufacturing cost=development cost+printed board cost×the expected number of sales.

Then, the control unit 22 calculates the cost for replacement (S73). The cost for replacement may be calculated according to the following equation:

cost for replacement=(cost for replacing the product at client site+component price+cost for component repair)×the expected number of sales×(1−yield rate of the printed board).

Here, the yield rate of the printed board is a value calculated based on the process S25.

Next, the control unit 22 calculates the profit (S74). The profit may be calculated according to the following equation:

profit=sales price−manufacturing cost−replacing cost.

Figure 33:
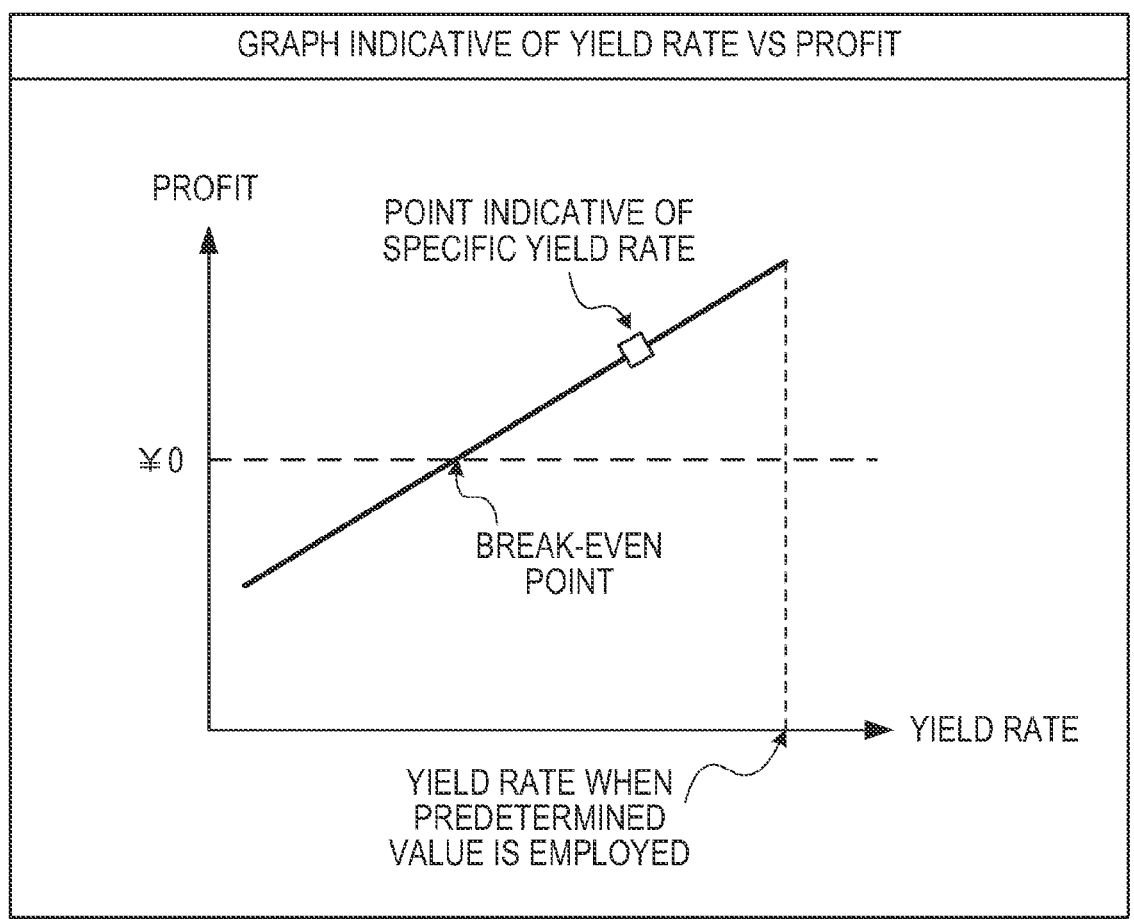
FIG. 33 illustrates a screen indicative of one example of a graph representing a relationship between a yield rate of printed board and the profit, according to the embodiment.

Then, the control unit 22 displays a graph representing a relationship between the yield rate of the printed board and the profit (S75), and the flow terminates. FIG. 33 illustrates a screen indicative of one example of the graph representing the relationship between the yield rate of the printed board and the profit according to the embodiment. A lateral axis represents the yield rate of the printed board and the longitudinal axis represents the profit, in this graph. This graph represents a relationship among the specified yield rate of the printed board and the profit, the yield rate of the printed board and the profit, in which a predetermined value with less risk is employed, and a break-even point.

According to the embodiment, an appropriate yield rate in consideration of the component variation may be calculated with respect to the occurrence of given bit errors in the signal transmission system. In addition, man-hours for risk evaluation may be reduced to ¹/₁₀ or less in comparison with those performed based on conventional calculations.

In addition, a design program for this signal transmission system may make a determination on whether the calculated yield rate satisfies a given condition on the yield rate or not.

Moreover, the acquisition unit 21 disclosed above may obtain the predetermined value or the like from design data of the signal transmission system.

Furthermore, the evaluation program, disclosed above, for evaluating the signal transmission system may be applicable to the signal transmission system design program that designs the signal transmission system.

Figure 34:
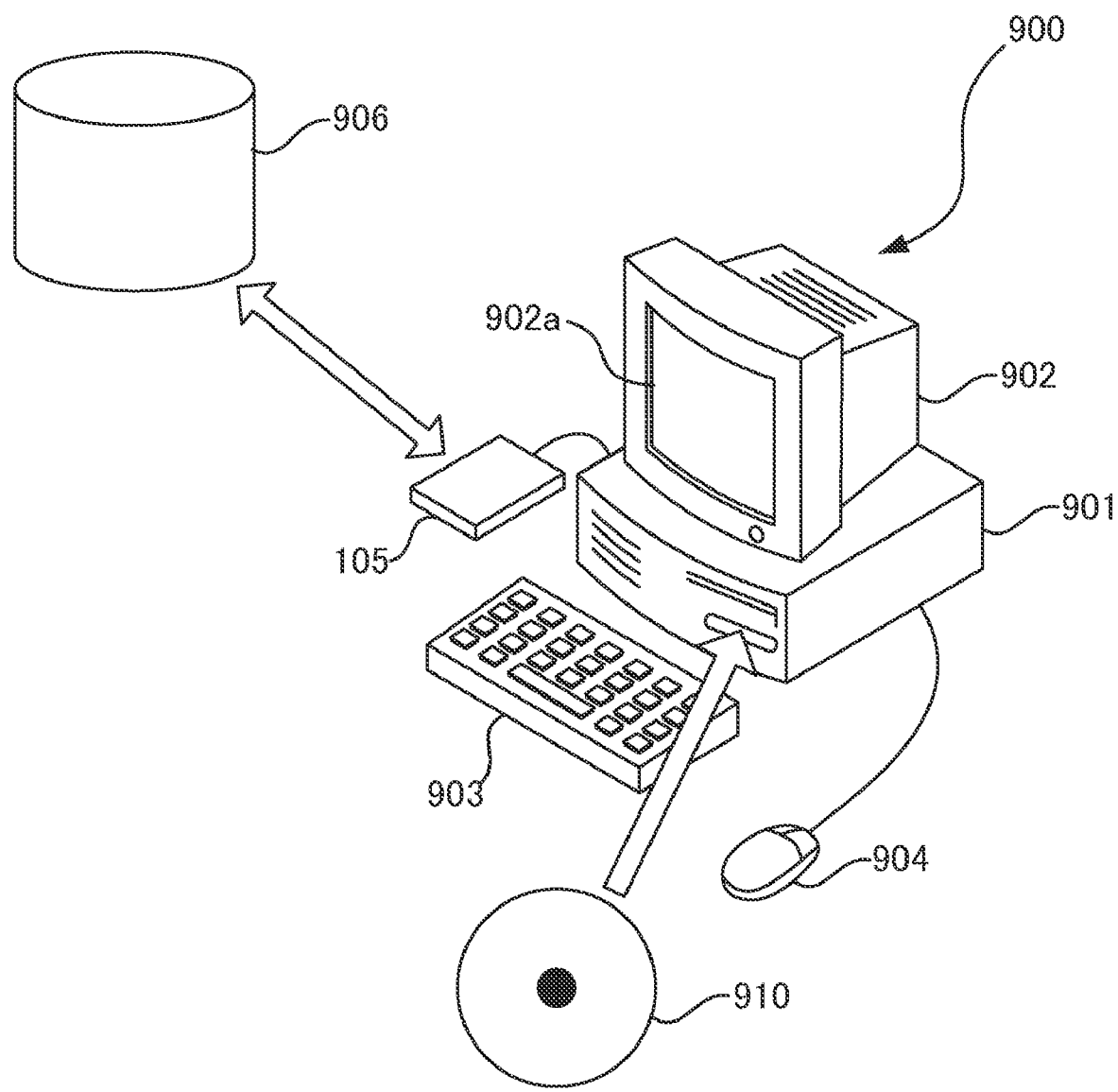
FIG. 34 illustrates a view indicative of one example of a computer system to which the embodiment is applied.

Note that the embodiment may be applicable to a computer system hereinafter disclosed. FIG. 34 illustrates a diagram indicative of one example of a computer system to which the embodiment may be applicable. A computer system 900 illustrated in FIG. 34 includes a main body unit 901 provided with a CPU, a disk drive or the like, a display 902 that displays an image based on an instruction from the main body unit 901, a keyboard 903 that is used for entering various pieces of information to the computer system 900, a mouse 904 that specifies an arbitrary position on a display screen 902a of the display 902, and a communication unit 905 that accesses an external database or the like and downloads a program or the like stored in the other computer system. A network communication card, a modem or the like may be applicable as the communication unit 905.

The program that causes the computer system, configuring the evaluation apparatus for evaluating the signal transmission system, to execute each of the steps disclosed above might be supplied as the evaluation program for the signal transmission system. The program is capable of being executed by the computer system configuring the evaluation apparatus for evaluating the signal transmission system, by way of storing the program on a storage medium readable by the computer system. The program that executes each of the steps disclosed above may be stored on a portable-type storage medium (for example, a disk 910 and so on) or may be downloaded by the communication apparatus 905, from a storage medium 906 of the other computer system. In addition, the evaluation program for evaluating the signal transmission system, at least including a function of evaluating the signal transmission system in the computer system 900, is input to the computer system 900 and compiled. The program causes the computer system 900 to operate as the evaluation apparatus for the signal transmission system that includes a function of evaluating the signal transmission system. Moreover, the program may be stored on a computer readable storage medium, for example, the disk 910 or the like. Here, the storage medium readable by the computer system 900 may include an internal storage device implemented in computers (for example, ROMs, RAMs and so on), the portable-type storage medium (for example, the disk 910, a flexible disk, a DVD disk, a magnet-optical disk, an IC card and so on), a database that stores computer programs, the other computer systems and a database thereof, and a variety of storage media accessible by the computer system coupled via the communication unit such as the communication device 905.

What is claimed is:

1. A signal transmission system evaluation apparatus which evaluates a quality of a signal transmission system, the signal transmission system including a sending device, a transmission path, and a receiving device, the signal transmission system evaluation apparatus comprising:
- an acquisition unit which acquires statistics about a variation in a characteristic value and a limit value of the characteristic value corresponding to a given range of variation, with respect to each of a plurality of characteristic values which represent characteristics of the components;
- a probability distribution calculation unit which calculates a probability distribution with respect to each of the characteristic values, based on the statistics acquired by the acquisition unit;
- an eye-opening calculation unit which calculates an eye-opening of the signal transmission system in a case that the characteristic value is equal to the limit value;
- an adjustment unit which makes an adjustment of the limit value so that the eye-opening calculated by the eye-opening calculation unit satisfies a given eye-opening condition; and
- a yield rate calculation unit which calculates a yield rate of the signal transmission system, based on the probability distribution calculated by the probability distribution calculation unit and the limit value adjusted by the adjustment unit.

2. The signal transmission system evaluation apparatus according to claim 1, wherein the eye-opening condition includes that the eye-opening lies outside of a given area.

3. The signal transmission system evaluation apparatus according to claim 2, wherein the given area has a hexagonal shape.

4. The signal transmission system evaluation apparatus according to claim 1, wherein the adjustment unit causes the limit value to approximate a median value of the variation until the eye-opening satisfies the eye-opening condition.

5. The signal transmission system evaluation apparatus according to claim 4, wherein the adjustment unit calculates a step value adjusting the limit value with respect to each of the characteristic values and causes all the limit values to approximate the median value of the variation by the step value until the eye-opening calculated by the eye-opening calculation unit satisfies the eye-opening condition.

6. The signal transmission system evaluation apparatus according to claim 5, wherein the adjustment unit divides a range of the variation in the characteristic value by a given division number, with respect to each of the characteristic values and defines a result of the division as the step value.

7. The signal transmission system evaluation apparatus according to claim 6, wherein the adjustment unit reduces the step value based on a distance between a give area and the eye-opening, with respect to each of the characteristic values.

8. The signal transmission system evaluation apparatus according to claim 1, wherein the probability distribution represents a normal distribution.

9. The signal transmission system evaluation apparatus according to claim 1, wherein the statistics include a median value of the variation in the characteristic value and a ratio of the limit value relative to a standard deviation of the variation in the characteristic value.

10. The signal transmission system evaluation apparatus according to claim 1, wherein the yield rate calculation unit calculates a yield rate with respect to each of the characteristic values based on the probability distribution calculated by the probability distribution calculation unit and the limit value adjusted by the adjustment unit and calculates the yield rate of the signal transmission system based on yield rates of all the characteristic values.

11. The signal transmission system evaluation apparatus according to claim 1, wherein the acquisition unit selects a characteristic value adjusted by the adjustment unit, based on a range of variation of the characteristic value.

12. The signal transmission system evaluation apparatus according to claim 11, wherein the adjustment unit selects a characteristic value, which is a target of the adjustment, based on a ratio of the range of variation relative to a median value of the variation in the characteristic value.

13. The signal transmission system evaluation apparatus according to claim 11, wherein
- the acquisition unit acquires an assumed error rate which is an error rate assumed based on the acquired limit value and a allowable error rate which is an error rate allowable in the signal transmission system, and
- the adjustment unit makes an adjustment of the limit value based on the limit value, the assumed error rate corresponding to the limit value, and the allowable error rate.

14. The signal transmission system evaluation apparatus according to claim 13, wherein the characteristic value includes a deterministic jitter and a random jitter, and
- wherein the adjustment unit makes an adjustment of the limit value of the random jitter based on the error rate acquired by the acquisition unit.

15. The signal transmission system evaluation apparatus according to claim 1, wherein the adjustment unit calculates an influence on the eye-opening by a change in the limit value, with respect to each of the characteristic values, as sensitivity, and the sensitivity selects a characteristic value which satisfies a given sensitivity condition, as a target of the adjustment.

16. The signal transmission system evaluation apparatus according to claim 15, wherein the sensitivity is an amount of change in the eye-opening relative to a given amount of change in the limit value.

17. The signal transmission system evaluation apparatus according to claim 16, wherein the given amount of change in the limit value represents a standard deviation of the variation in the characteristic value.

18. The signal transmission system evaluation apparatus according to claim 1, wherein
- the acquisition unit acquires a first characteristic value and a second characteristic value as the characteristic value and defines a limit value of the first characteristic value as a first acquisition limit value;
- the adjustment unit makes an adjustment of the limit value of the first characteristic value and defines a result of the adjustment as a first adjustment limit value as well as makes an adjustment of a limit value of the second characteristic value and defines a result of the adjustment as a second adjustment limit value, and performs a first adjustment process which causes the first adjustment limit value to approximate the first acquisition limit value and a second adjustment process which causes the second adjustment limit value to approximate a median value of a variation in the second characteristic value so that the eye-opening satisfies the given eye-opening condition; and
- the yield rate calculation unit calculates an amount of increase in a yield rate by the first adjustment process and the second adjustment process and increases the yield rate of the signal transmission system by the amount of increase.

19. A signal transmission system evaluation method which evaluates quality of a signal transmission system, the signal transmission system including a sending device, a transmission path, and a receiving device, the method comprising:

acquiring statistics about a variation in a characteristic value and a limit value of the characteristic value corresponding to a given range of variation, with respect to each of a plurality of characteristic values which represent characteristics of the components;

calculating a probability distribution with respect to each of the characteristic values, based on the acquired statistics;

calculating an eye-opening of the signal transmission system in case that the characteristic value is equal to the limit value;

making an adjustment of the limit value so that the calculated eye-opening satisfies a given eye-opening condition; and calculating a yield rate of the signal transmission system, based on the calculated probability distribution and the limit value adjusted by the adjustment unit.

20. A storage medium storing a signal transmission system evaluation program which causes a computer to evaluate a quality of a signal transmission system, the signal transmission system including a sending device, a transmission path, and a receiving device, where the program causes the computer to execute a process, the process comprising instructions for performing:

acquiring statistics about a variation in a characteristic value and a limit value of the characteristic value corresponding to a given range of variation, with respect to each of a plurality of characteristic values which represent characteristics of the components;

calculating a probability distribution with respect to each of the characteristic values, based on the acquired statistics;

calculating an eye-opening of the signal transmission system in case that the characteristic value is equal to the limit value;

making an adjustment of the limit value so that the calculated eye-opening satisfies a given eye-opening condition; and calculating a yield rate of the signal transmission system, based on the calculated probability distribution and the limit value adjusted by the adjustment unit.

* * * * *